US007821382B2

(12) United States Patent  
Kameyama

(10) Patent No.: US 7,821,382 B2  
(45) Date of Patent: Oct. 26, 2010

(54) VEHICULAR USER HOSPITALITY SYSTEM

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/173,500

(22) Filed: Jul. 15, 2008

(65) Prior Publication Data

US 2009/0030619 A1     Jan. 29, 2009

(30) Foreign Application Priority Data

Jul. 23, 2007     (JP)     ............... 2007-191392

(51) Int. Cl.
*B60Q 1/00*     (2006.01)
(52) U.S. Cl. ...................... 340/425.5; 702/19
(58) Field of Classification Search .............. 340/425.5; 702/94, 19; 705/1; 455/426.1
See application file for complete search history.

(56) References Cited

U.S. PATENT DOCUMENTS

2006/0046684 A1     3/2006     Kameyama
2006/0235753 A1*     10/2006     Kameyama ................... 705/15

FOREIGN PATENT DOCUMENTS

JP     2007-099249     4/2007
JP     2007-145225     6/2007

OTHER PUBLICATIONS

Extended European Search Report dated Mar. 26, 2010, issued in corresponding European Application No. 08012097.5-2221.

* cited by examiner

*Primary Examiner*—Daniel Wu
*Assistant Examiner*—Shirley Lu
(74) *Attorney, Agent, or Firm*—Nixon & Vanderhye

(57) ABSTRACT

A vehicular user hospitality system recognizes a situation concerning vehicle use according to a combination of a disturbance stimulation type and hospitality intention category. With an intention estimation table, the system determines a reference intention parameter value for providing an intensity reference of a hospitality intention for each of safety, convenience, and comfort categories. The system settles an intention intensity reference using a reference intention parameter value specific to each situation. The system supplements the reference intention parameter value with the current disturbance stimulation value to determine an intention intensity parameter value to be appropriately used as a function selection reference value while considering a disturbance stimulation magnitude. Using a function specification table, function specification information for specifying a function of a hospitality operating portion is extracted according to a combination of the disturbance stimulation type and the hospitality intention category to thereby determine a control content.

11 Claims, 25 Drawing Sheets

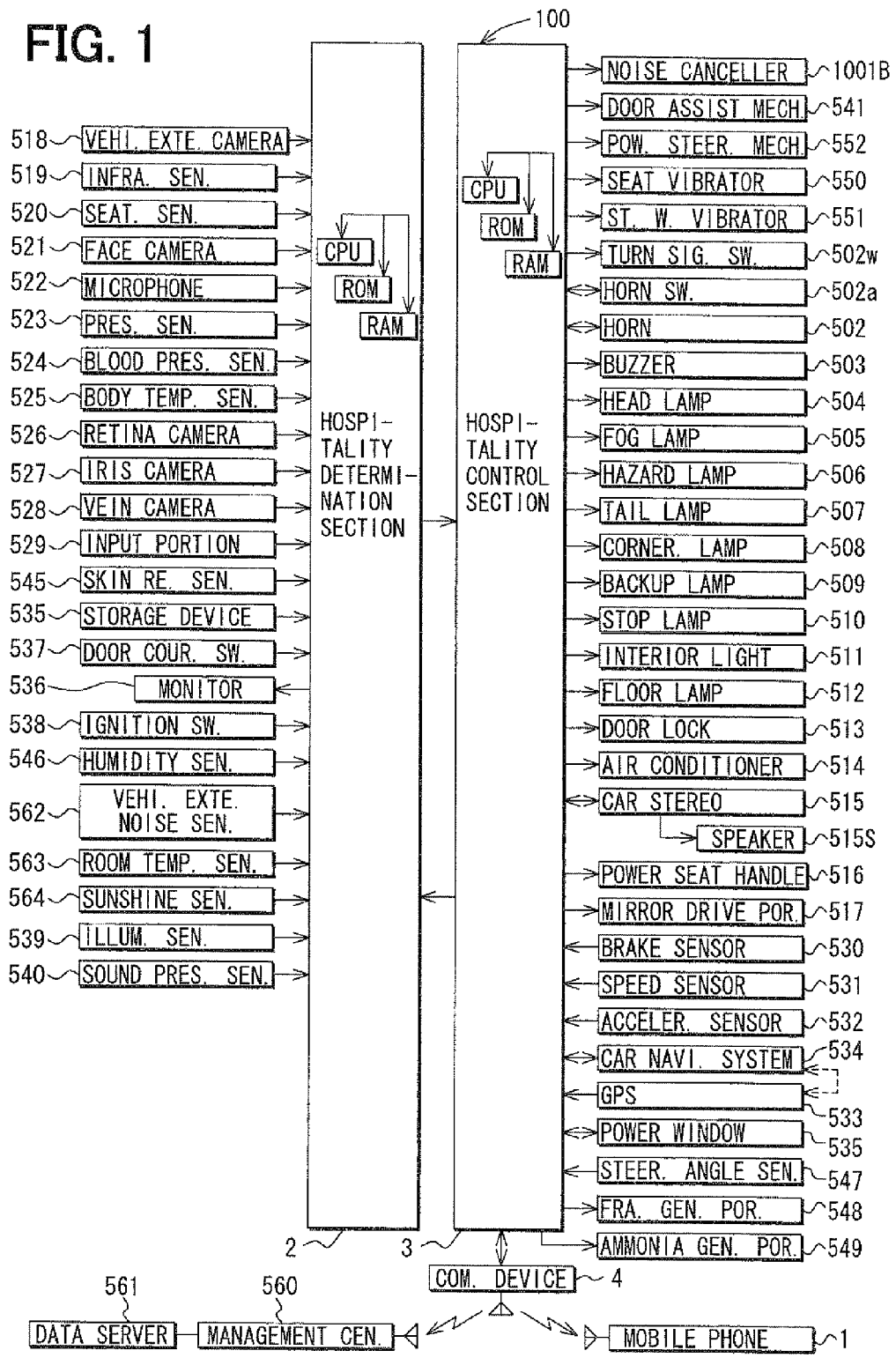

| USER 1 | CHARACTER 1 | RANK ORDER 1 | Dfb1 | Dfm1 |
|---|---|---|---|---|
| USER 2 | CHARACTER 2 | RANK ORDER 2 | Dfb2 | Dfm2 |
| USER 3 | CHARACTER 3 | RANK ORDER 3 | Dfb3 | Dfm3 |
| USER 4 | CHARACTER 4 | RANK ORDER 4 | Dfb4 | Dfm4 |

600

| CHARACTER CODE | LIGHT COLOR CODE | LIGHTING PATTERN CONTROL DATA |
|---|---|---|
| SKC1 | CC1 | CD1 (RED FLASH) |
| SKC2 | CC2 | CD2 (UMBER/FADE) |
| SKC3 | CC3 | CD3 (BLUE CONTINUOUS FLASHING) |

|    | R   | G   | B   | MIXED COLOR   |
|----|-----|-----|-----|---------------|
| 0  | 1   | 1   | 1   | WHITE         |
| 1  | 1   | 0.5 | 1   | PALE PURPLE   |
| 2  | 1   | 0   | 1   | PURPLE        |
| 3  | 0.5 | 0   | 1   | BLUISH PURPLE |
| 4  | 0   | 0   | 1   | BLUE          |
| 5  | 0.5 | 0.5 | 1   | PALE BLUE     |
| 6  | 1   | 1   | 1   | WHITE         |
| 7  | 1   | 1   | 0.5 | PALE ORANGE   |
| 8  | 1   | 1   | 0   | ORANGE        |
| 9  | 1   | 0   | 0   | RED           |
| 10 | 1   | 0.5 | 0.5 | PINK          |
| 11 | 1   | 1   | 1   | WHITE         |
| 12 | 0.5 | 1   | 1   | LEMON         |
| 13 | 0   | 1   | 1   | YELLOW        |
| 14 | 0   | 1   | 0   | PALE GREEN    |

WHEN FRONT ATTITUDE IS STABLE: NEUTRAL POINT
WHEN ATTITUDE IS SHIFTED LEFT: SHIFT TO +
WHEN ATTITUDE IS SHIFTED RIGHT: SHIFT TO −

FIG. 11

| SONG ID | SONG NAME | GENRE CODE | CHARACTER CODE | AGE CODE | SEX CODE | MUSIC DATA | SONG MODE |
|---|---|---|---|---|---|---|---|
| SONG ID 1 | SONG NAME 1 | GENRE CODE 1 | CHARACTER CODE 1 | AGE CODE 1 | SEX CODE 1 | MUSIC DATA 1 | SONG MODE 1 |
| SONG ID 2 | SONG NAME 2 | GENRE CODE 2 | CHARACTER CODE 2 | AGE CODE 2 | SEX CODE 2 | MUSIC DATA 2 | SONG MODE 2 |
| SONG ID 3 | SONG NAME 3 | GENRE CODE 3 | CHARACTER CODE 3 | AGE CODE 3 | SEX CODE 3 | MUSIC DATA 3 | SONG MODE 3 |
| SONG ID 4 | SONG NAME 4 | GENRE CODE 4 | CHARACTER CODE 4 | AGE CODE 4 | SEX CODE 4 | MUSIC DATA 4 | SONG MODE 4 |
| ⋮ | ⋮ | ⋮ | ⋮ | ⋮ | ⋮ | ⋮ | ⋮ |

PHYSICAL INDEX, MENTAL INDEX → 401

CHARACTER CODE (SKC)

SKC1: ACTIVE
SKC2: GENTLE
SKC3: OPTIMISTIC
SKC4: PESSIMISTIC
SKC5: DECADENT
SKC6: PHYSICAL
SKC7: INTELLIGENT
SKC8: ROMANTICIST

GENRE CODE (JC)

JC1: CLASSIC
JC2: JAZZ
JC3: ROCK
JC4: POPS
JC5: JAPANESE MUSIC
JC6: WORLD MUSIC
JC7: MOOD

AGE CODE (AC)

AC1: INFANT (TO 5 YEARS)
AC2: CHILD (6 TO 11)
AC3: JUNIOR (12 TO 17)
AC4: YOUTH (18 TO 27)
AC5: MIDDLE AGE (28 TO 37)
AC6: SENIOR (38 TO 45)
AC7: MATURE AGE (46 TO 63)
AC8: OLD AGE (64 TO OVER)
AC9: REGARDLESS OF AGE

SEX CODE (SC)

SC1: MALE
SC2: FEMALE
SC3: REGARDLESS OF SEX

SONG MODE

AG: UPLIFTING, ACTIVATING
ST: REFRESHING
SF: MILD, SOOTHING
HL: HEALING, $\alpha$-WAVE

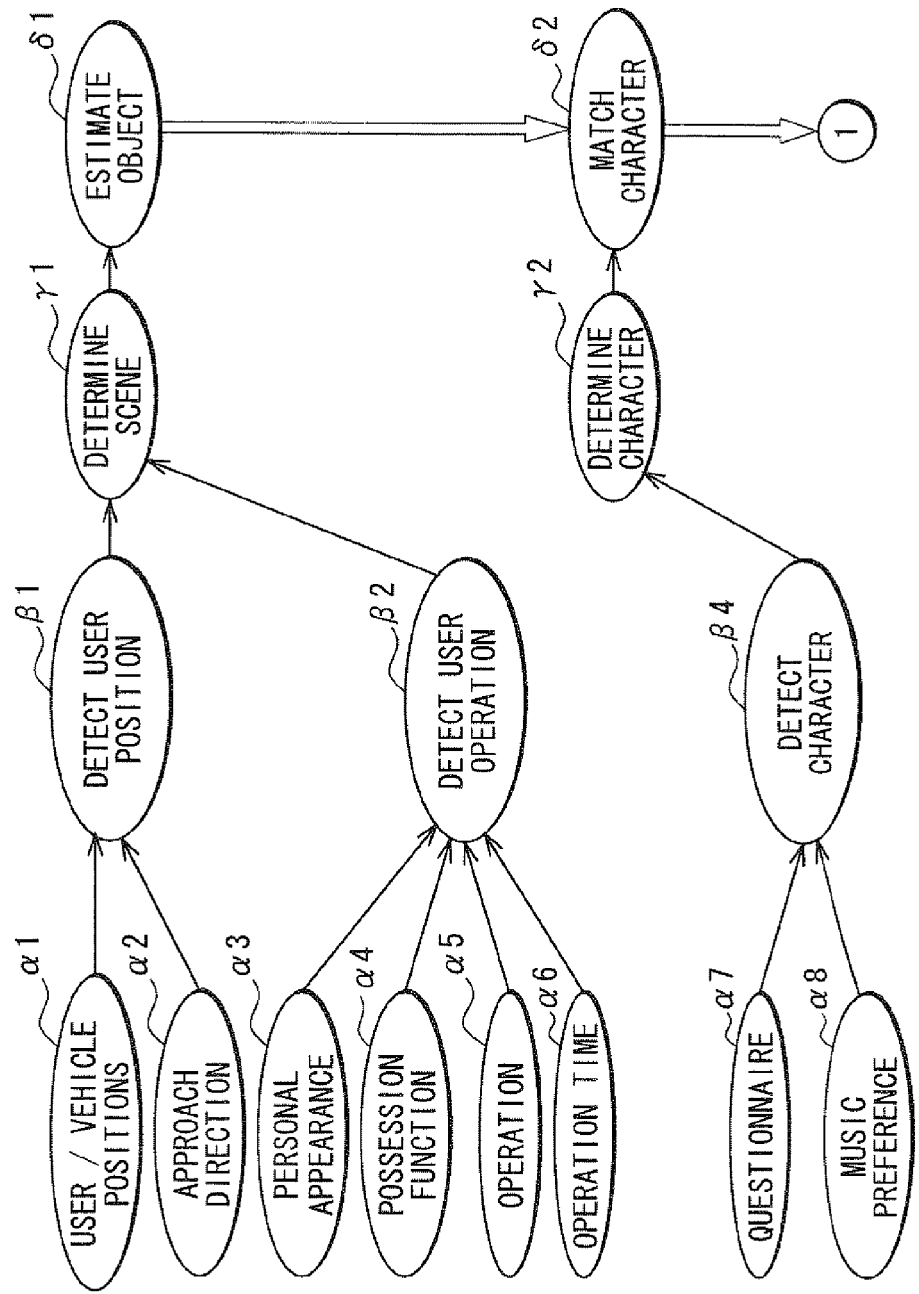

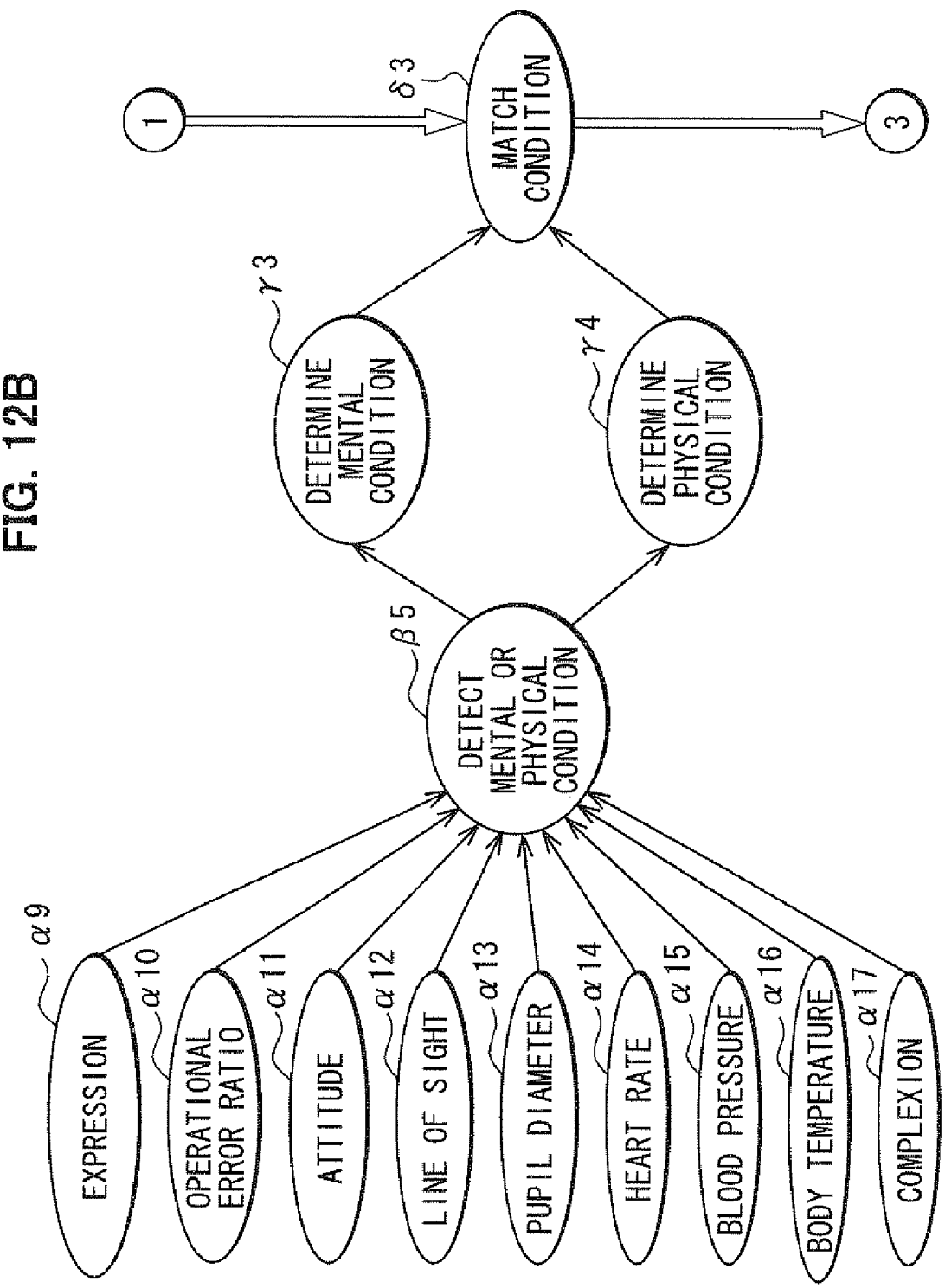

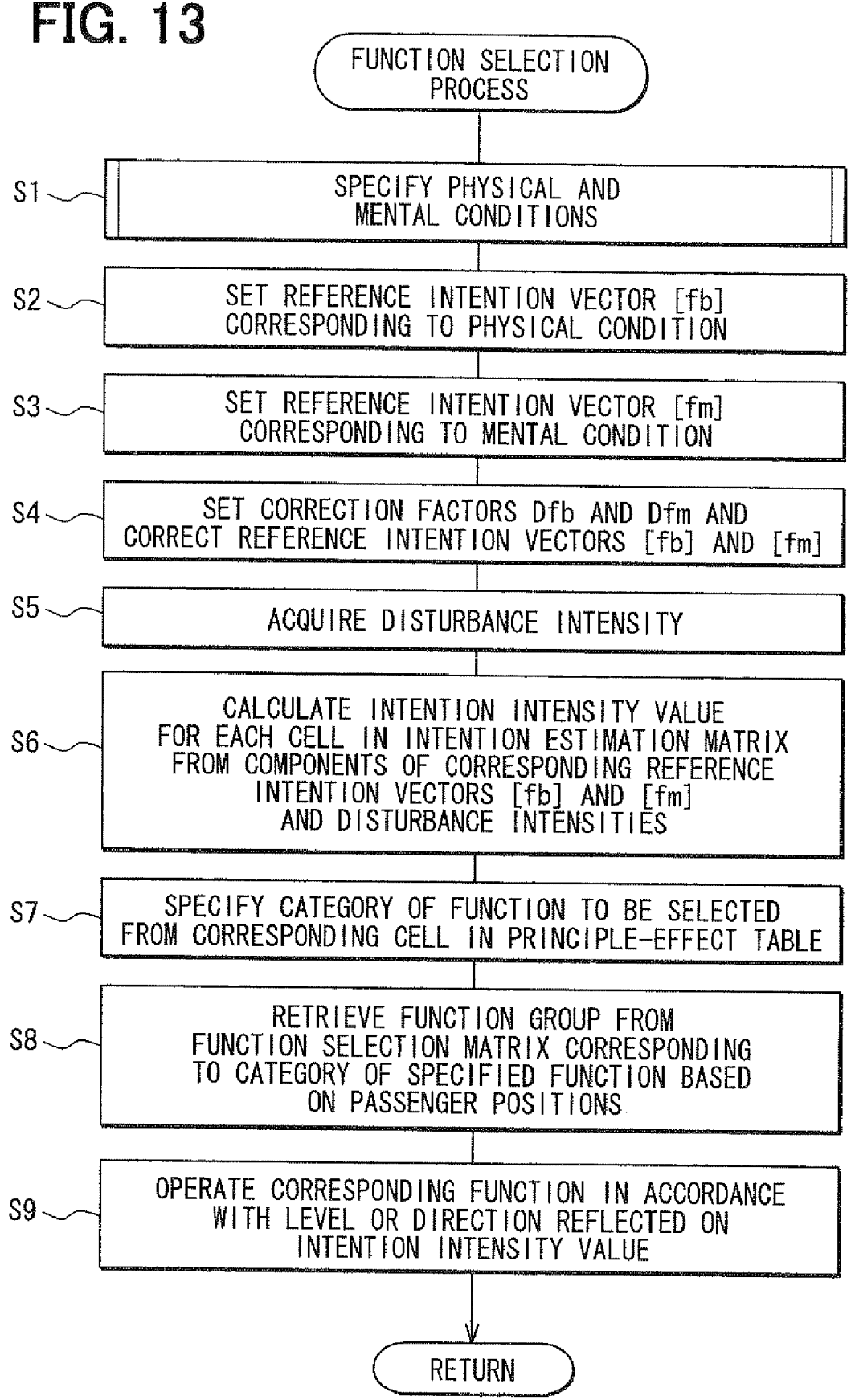

FIG. 14

| FIG. 14A |
|---|
| FIG. 14B |

| STATE TO BE SPECIFIED | | BIOLOGICAL PARAMETER | | | | | | EXPRESSION | | ATTITUDE | |
|---|---|---|---|---|---|---|---|---|---|---|---|
| PHYSICAL CONDITION | MENTAL CONDITION | BLOOD PRESSURE | | BODY TEMP. | | SKIN RESISTANCE | | MEANING | CHANGE | MOVE | SPEED |
| | | CHANGE | DIREC. | CHANGE | DIREC. | CHANGE | DIREC. | | | | |
| NORMAL | NEUTRAL (CENTER) | — | — | — | — | — | — | — | — | — | — |
| TIRED | NEUTRAL (CENTER) | FAST | VARYING | — | — | FAST | INCR. | FACE DIRECTION | SUDDEN INCR. | INCR. AND DECR. | — |
| NORMAL | NEUTRAL (UPLIFTING) | SLOW | — | SLOW | — | — | — | UNPLEASANT | SLIGHT INCR. | SLIGHT INCR. | — |
| NORMAL | NEUTRAL (SOOTHING) | | | | | | | | | | |
| SLIGHTLY ABNORMAL | NEUTRAL (CENTER) | | | | | | | | | | |
| CONSIDERABLY ABNORMAL | NEUTRAL (SOOTHING) | SLOW | — | SLOW | — | SLOW | INCR. | UNPLEASANT | INCR. | INCR. AND DECR. | DECR. |
| NORMAL | PASSIONATE OR EXCITED | FAST | VARYING | FAST | VARYING | FAST | DECR. | EXCITED | SUDDEN INCR. | SUDDEN INCR. | INCR. |
| TIRED | NEUTRAL (SOOTHING) | FAST | VARYING | SLOW | — | FAST | INCR. | FACE DIREC./ UNPLEASANT | INCR. | INCR. AND DECR. | — |
| CONSIDERABLY ABNORMAL | DISAPPOINTED | FAST | VARYING | SLOW | — | SLOW | INCR. | UNPLEASANT | INCR. | INCR. AND DECR. | DECR. |
| SLIGHTLY ABNORMAL | PASSIONATE OR EXCITED | FAST | — | FAST | — | FAST | DECR. | EXCITED | SUDDEN INCR. | SUDDEN INCR. | INCR. |
| TIRED | DISAPPOINTED | — | — | SLOW | — | SLOW | INCR. | NO EXPRESSION OR UNPLEASANT | SLIGHT INCR. | — | — |

FIG. 14B

| \multicolumn{3}{c|}{LINE OF SIGHT} | PUPIL | \multicolumn{2}{c|}{STEERING} | COLLATION COUNTER |
|---|---|---|---|---|---|---|
| MOVE | SPEED | PATTERN | DIAMETER | ERROR | SPEED | MATCHING COUNT |
| — | — | — | — | — | — | $N_0$ |
| SUDDEN INCR. | — | MODULATION | VARYING | INCR. | — | $N_1$ |
| DECR. | — | | | | | $N_2$ |
| | SUDDEN DECR. | | | | | $N_9$ |
| | SUDDEN INCR. | | | | | $N_9$ |
| SUDDEN DECR. | | MODULATION | — | INCR. | DECR. | $N_3$ |
| SUDDEN DECR. | SUDDEN DECR. | MODULATION | OPENED | INCR. | INCR. | $N_4$ |
| SUDDEN INCR. | SUDDEN INCR. | MODULATION | VARYING | INCR. | — | $N_5$ |
| SUDDEN DECR. | SUDDEN DECR. | MODULATION | VARYING | INCR. | DECR. | $N_6$ |
| SUDDEN DECR. | SUDDEN INCR. | MODULATION | OPENED | INCR. | INCR. | $N_7$ |
| DECR. | — | — | — | INCR. | — | $N_8$ |

|  |  | NORMAL | | ABNORMAL | |
|---|---|---|---|---|---|
|  |  | NORMAL | TIRED | SLIGHT | SERIOUS |
| [fb] | fb1 | 0.5 | 0.5 | 0.8 | 1 |
|  | fb2 | 0.5 | 0.5 | 0.8 | 1 |
|  | fb3 | 0.2 | 0.5 | 1 | 1 |
|  | fb4 | 0.2 | 0.5 | 1 | 1 |
|  | fb5 | 0.2 | 0.2 | 0.5 | 1 |

|  |  | PASSIONATE OR EXCITED | DISAPPOINTED | NEUTRAL | | |
|---|---|---|---|---|---|---|
|  |  |  |  | CENTER VALUE | UPLIFTING | SOOTHING |
| [fm] | fm1 | 1 | 1 | 1 | 0.8 | 1 |
|  | fm2 | 1 | 1 | 1 | 0.8 | 1 |
|  | fm3 | 0.2 | 0.2 | 0.2 | 1 | 0.5 |
|  | fm4 | 0.2 | 0.2 | 0.2 | 1 | 0.5 |
|  | fm5 | 0.2 | 1 | 0.2 | 1 | 0.2 |
|  | fm6 | 0.8 | 0.2 | 0.2 | 0.2 | 1 |
|  | fm7 | 0.8 | 0.2 | 0.2 | 0.2 | 1 |

|  | WEAK | NEUTRAL | STRONG |
|---|---|---|---|
| Dfb | 0.8 | 1.0 | 1.2 |

|  | SLOW | NEUTRAL | FAST |
|---|---|---|---|
| Dfm | 0.8 | 1.0 | 1.2 |

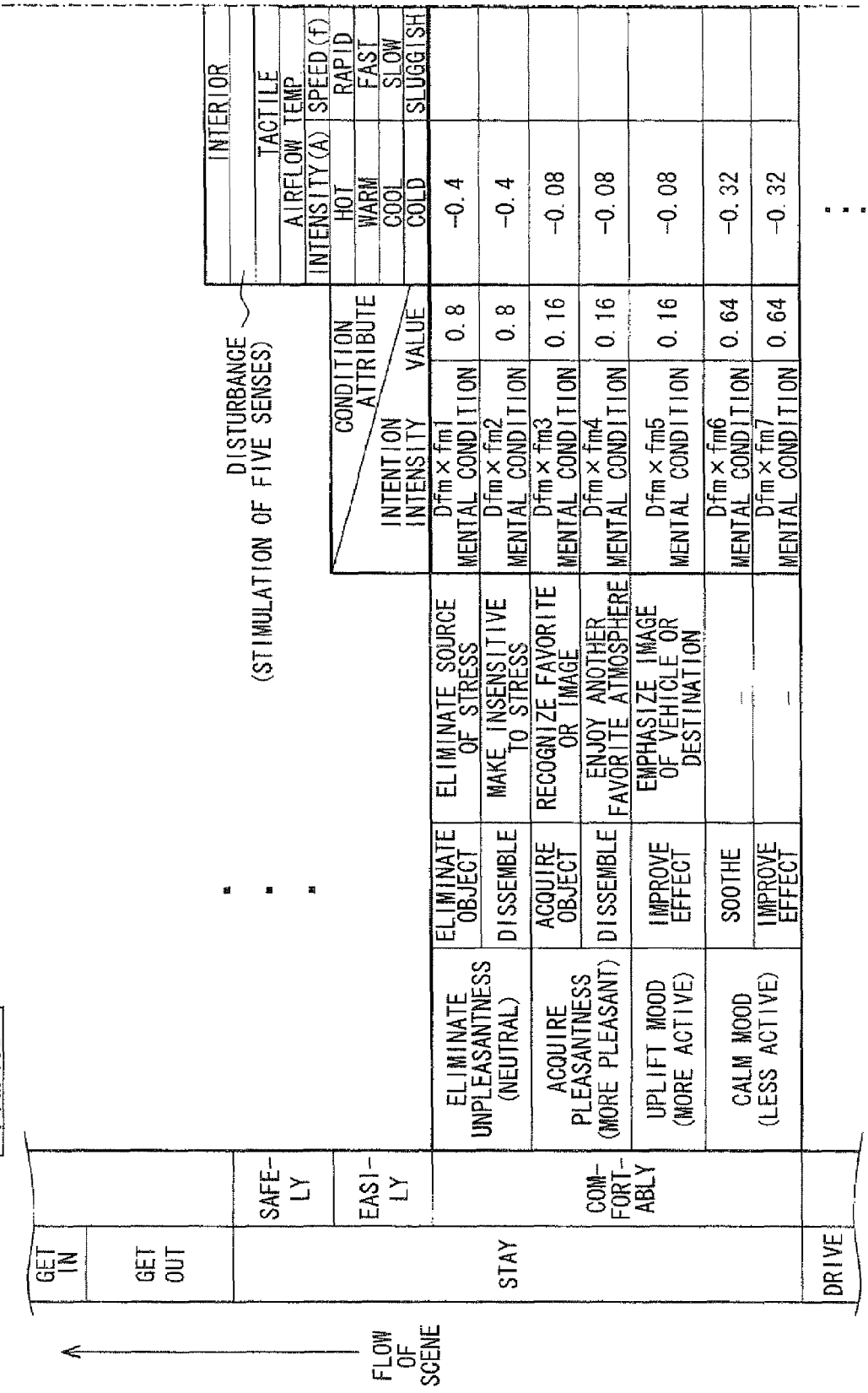

FIG. 19B

| OBJECT TEMP. INTENSITY(A) | TACTILE HUMIDITY INTENSITY(A) | DISTURBANCE (STIMULATION OF FIVE SENSES) PRESSURE (VIBRATION) INTENSITY(A) | SPEED(f) | VISUAL ILLUMINANCE INTENSITY(A) | SPEED(f) | AUDITORY SOUND INTENSITY(A) | SPEED(f) | DISTURBANCE POINT |
|---|---|---|---|---|---|---|---|---|
| HOT | WET/MOISTENED | LARGE | HIGH | GLARING | WARM COLOR | NOISY | LIVELY | MAX/FAST +1.0 / MEDIUM LARGE +0.5 / MEDIUM SMALL -0.5 / MIN/SLOW -1.0 |
| COLD | DRY | SMALL | LOW | DIM / DARK | COLD COLOR | QUIET | GENTLY | |
| | | -0.4 | | -0.8 | | 0.8 | | |
| | | -0.4 | | -0.8 | | 0.8 | | |
| | | -0.08 | | -0.16 | | 0.16 | | |
| | | -0.08 | | -0.16 | | 0.16 | | |
| | | -0.32 | | -0.64 | | 0.64 | | |
| | | -0.32 | | -0.64 | | 0.64 | | |

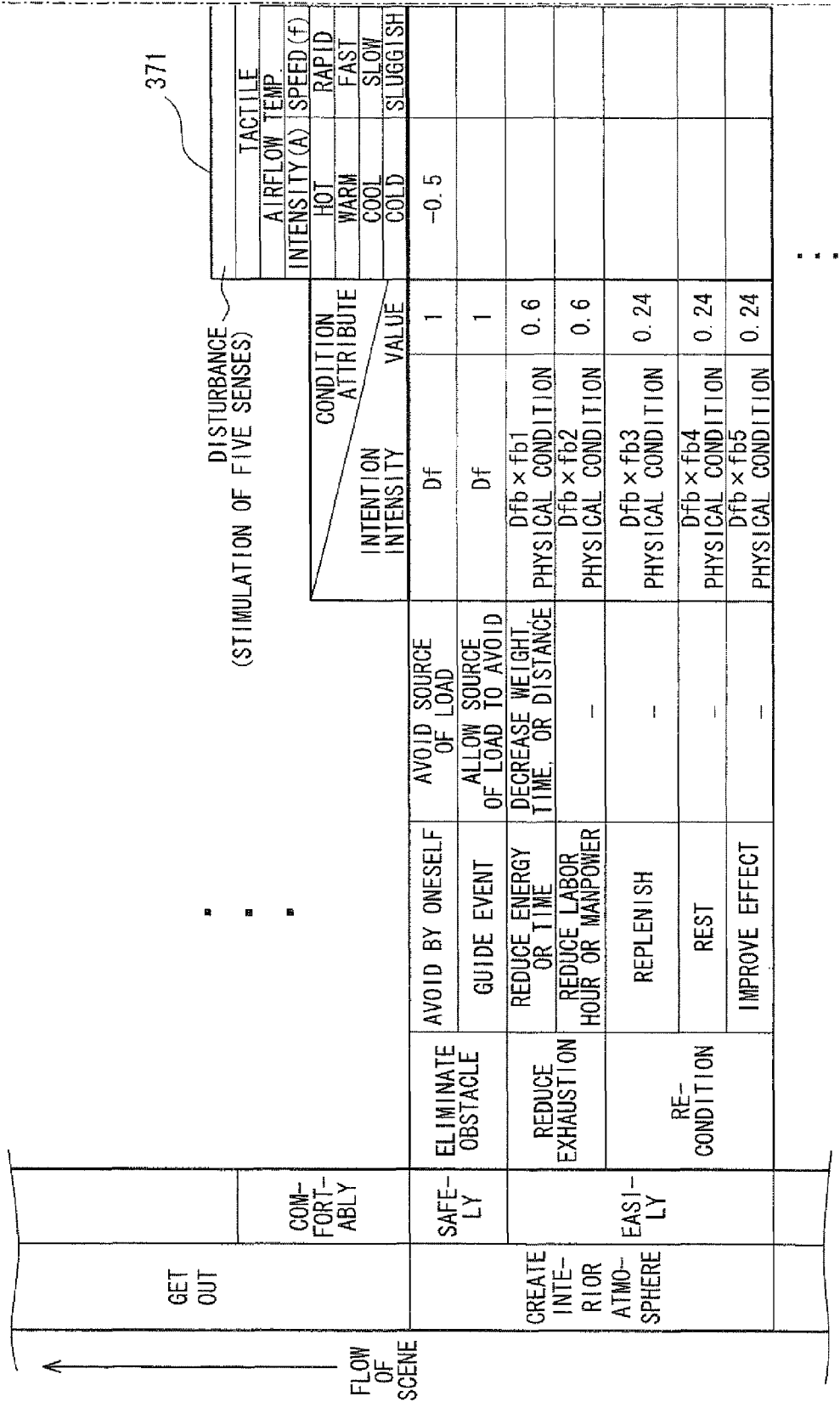

FIG. 20B

| DISTURBANCE (STIMULATION OF FIVE SENSES) | | | | | | | | | DISTURBANCE POINT |
|---|---|---|---|---|---|---|---|---|---|
| TACTILE | | | PRESSURE (VIBRATION) | | VISUAL | | AUDITORY | | |
| OBJECT TEMP | | HUMIDITY | | | ILLUMINANCE | | SOUND | | |
| INTENSITY(A) | | INTENSITY(A) | INTENSITY(A) | SPEED(f) | INTENSITY(A) | SPEED(f) | INTENSITY(A) | SPEED(f) | |
| HOT | | WET | LARGE | HIGH | GLARING | WARM COLOR | NOISY | LIVELY | MAX/FAST +1.0 |
| | | MOISTENED | | | DIM | | | | MEDIUM LARGE +0.5 |
| COLD | | DRY | SMALL | LOW | DARK | COLD COLOR | QUIET | GENTLY | MEDIUM SMALL -0.5 |
| | | | -0.5 | | -1 | | 1 | | MIN/SLOW -1.0 |

FIG. 21

| FIG. 21A |
|----------|
| FIG. 21B |

FIG. 21A

| | | | | | SPACE EFFECT | | INTENSITY, DISTURBANCE TYPE, EXPECTED VALUE — DISTURBANCE |
|---|---|---|---|---|---|---|---|
| GET IN | | | | | | BURDEN OR EXPECTATION | |
| GET OUT | EASILY | ELIMINATE UNPLEASANTNESS (NEUTRAL) | ELIMINATE SOURCE OF STRESS | | | ELIMINATE NOISE | |
| | | | | | | ELIMINATE HEAT OR COLD | |
| | | | | | | STRENGTHEN COMMUNICATION | |
| STAY | | | CHANGE INTEREST OR DISSEMBLE | | | PROVIDE INTERESTED INFO. | |
| | | ACQUIRE PLEASANTNESS (MORE PLEASANT) | FAVORITE OR IMAGE IS AVAILABLE | | | (COMMON) PROVIDE INTERESTED INFO. | |
| | COMFORTABLY | | | | | (COMMON) PROVIDE FAVORABLE IMPRESSION | |
| | | UPLIFT MOOD (MORE ACTIVE) | INTERESTED MATTER PROCEEDS AS INTENDED | | | GIVE PREFERENCE TO ONESELF | |
| | | | | | | APPEAL ONESELF | |
| | | CALM MOOD (LESS ACTIVE) | SETTING IS ADJUSTED FOR ENJOYING FAVORITES | | | COOPERATE | |
| DRIVE | | | CONSCIOUSNESS CAN BE FREED | | | — | |

FIG. 21B

| VISUAL | | AUDITORY | | TACTILE | |
|---|---|---|---|---|---|
| RATIONAL | EMOTIONAL | RATIONAL | EMOTIONAL | RATIONAL | EMOTIONAL |
|  |  |  | SOUND PREVENTED INTERIORLY |  | AIR-CONDITIONED INTERIORLY |
| DISPLAYED INTERIORLY | ILLUMINATED INTERIORLY |  |  |  |  |
| DISPLAYED INTERIORLY | ILLUMINATED INTERIORLY | VOICE GENERATED INTERIORLY | MUSIC GENERATED |  |  |
| ALL DISPLAYED INTERIORLY |  |  |  |  |  |
|  | ALL ILLUMINATED INTERIORLY |  | MUSIC GENERATED | ALL DISPLAYED INTERIORLY | SOUND GENERATED INTERIORLY |
|  | ILLUMINATED INTERIORLY | VOICE GENERATED INTERIORLY | MUSIC GENERATED |  |  |
|  | ILLUMINATED INTERIORLY | VOICE GENERATED INTERIORLY | MUSIC GENERATED |  |  |
|  | ALL ILLUMINATED INTERIORLY | ALL VOICES GENERATED INTERIORLY | MUSIC GENERATED |  |  |
| ALL DISPLAYED INTERIORLY |  |  |  |  |  |

| FIG. 22A |
|----------|
| FIG. 22B |

FIG. 22A

| | | | | 373 ──┐ | | | | |
|---|---|---|---|---|---|---|---|---|
| | | | FUNCTION | | | | | |
| | | | PASSENGER POSITION | | | DISPLAY | | |
| | | | FRONT OR REAR | LEFT OR RIGHT | TOP OR BOTTOM | EF-FECT | NOR-MAL | EVALU-ATION |
| INTERIOR EFFECT | VISUAL EFFECT | ILLUMI-NATION | FRONT | LEFT | TOP | | | |
| | | | | | BOTTOM | | | |
| | | | | RIGHT | TOP | | | |
| | | | | | BOTTOM | | | |
| | | | REAR | LEFT | TOP | | | |
| | | | | | BOTTOM | | | |
| | | | | RIGHT | TOP | | | |
| | | | | | BOTTOM | | | |
| | AUDITORY EFFECT | SOUND GENER-ATION | | | | | | |
| | | VOICE GENER-ATION | | | | | | |
| | | MUTING | | | | | | |
| | TACTILE EFFECT | HEATING | | | | | | |
| | | COOLING | | | | | | |

FIG. 22B

| | FUNCTION | | | | | | | | | | |
|---|---|---|---|---|---|---|---|---|---|---|---|
| INTERIOR | | | ILLUMINATION | | | AUDIO | | | DOOR | | |
| EF-FECT | NOR-MAL | EVALU-ATION | EF-FECT | NOR-MAL | EVALU-ATION | EF-FECT | NOR-MAL | EVALU-ATION | EF-FECT | NOR-MAL | EVALU-ATION |
| | | | 3 | | | | | | | | |
| | | | 3 | | | | | | | | |
| | | | 3 | | | | | | | | |
| | | | 3 | | | | | | | | |
| | | | 3 | | | | | | | | |
| | | | 3 | | | | | | | | |
| | | | 3 | | | | | | | | |
| | | | 3 | | | | | | | | |

373

VEHICULAR USER HOSPITALITY SYSTEM

CROSS REFERENCE TO RELATED APPLICATION

This application is based on and incorporates herein by reference Japanese Patent Application No. 2007-191392 filed on Jul. 23, 2007.

FIELD OF THE INVENTION

The present invention relates to a vehicular user hospitality system for assisting use of a vehicle by a user or for entertaining (servicing) the user in at least one of a case where the user approaches the vehicle, a case where the user gets in the vehicle, a case where the user drives the vehicle, a case where the user gets out of the vehicle, and a case where the user separates from the vehicle.

BACKGROUND OF THE INVENTION

Patent Document 1: JP-2007-145226 A (corresponding to US2006/0235753)
Patent Document 1: JP-2007-145225 A
Patent Document 1: JP-2007-099249 A Patent Documents 1 through 3 disclose the vehicular user hospitality systems so controlled as to change operation contents of a hospitality operating portion in accordance with a scene specified by a user for using a vehicle.

However, the above-mentioned systems do not satisfactorily reflect wish of a user for hospitality and a user state on the function selection and its operation level and may cause an unsatisfactory result.

SUMMARY OF THE INVENTION

It is an object of the present invention to provide a vehicular user hospitality system capable of appropriately recognizing a user request for hospitality from a system according to situations in consideration for a user state and autonomously controlling operations of a vehicle-mounted apparatus in a mode most favored or supposed to be favored by the user with the full intention to positively treat the user as a master or a guest in a vehicle.

According to an example of the present invention, a vehicular user hospitality system is provided as follows. A plurality of hospitality operating portions are included that perform a hospitality operation for assisting a user to use a vehicle or for entertaining a user. A biological condition acquisition means is included that acquires biological user information reflecting a physical condition and a mental condition of a user. A physical/mental condition specification means is included for specifying a physical condition and a mental condition of the user based on a content of acquired biological user information. A hospitality determination section is included that determines a content of a hospitality operation performed by the hospitality operating portion based on specified physical or mental condition. A hospitality control section is included that controls an operation of a corresponding hospitality operating portion so as to perform a hospitality operation in accordance with a content determined by the hospitality determination section. The hospitality determination section includes: a reference intention intensity parameter value determination means for uniquely determining a reference intention parameter value in accordance with the specified physical or mental condition in regard to a set of reference intention parameters that is defined so as to individually correspond to a plurality of hospitality intention categories containing at least one of safety, convenience, and comfort, and provides a reference value of an intention intensity for each hospitality intention; a disturbance stimulation detection means for detecting a plurality of disturbance stimulations containing at least one of tactile-sense, visual-sense, auditory-sense, and olfactory-sense attributes concerning the user; a storage portion for an intention estimation table that is constructed as a two-dimensional table for associating a type of the disturbance stimulation with the hospitality intention category and contains a cell assigned with an intention intensity parameter value; a storage portion for a function specification table that is constructed as a two-dimensional table for associating a type of the disturbance stimulation with the hospitality intention category and contains a cell storing function specification information for specifying a function of the hospitality operating portion matching an attribute of the disturbance stimulation and the hospitality intention category; an intention intensity parameter calculation means for calculating and assigning the intention intensity parameter value to each cell of the intention estimation table using a reference intention parameter value for the corresponding hospitality intention category and a disturbance stimulation value of the corresponding type; a function extraction means for extracting a function of the hospitality operating portion from a corresponding cell of the function extraction table associated with cells in the intention estimation table in accordance with a combination of the hospitality intention category and the disturbance stimulation attribute; and a control content determination means for determining a control content of an extracted function based on the intention intensity parameter value assigned to a cell of the intention estimation table. The hospitality control section controls operations of the function of the hospitality operating portion based on the determined control content.

BRIEF DESCRIPTION OF THE DRAWINGS

The above and other objects, features, and advantages of the present invention will become more apparent from the following detailed description made with reference to the accompanying drawings. In the drawings:

FIG. 1 is a block diagram showing an example of an electric structure of a vehicular user hospitality system according to an embodiment of the present invention;

FIG. 5 is a diagram showing relationship between mixing ratios of RGB full color lights and lighting colors;

FIG. 11 is a conceptual diagram showing a content of a music source database;

FIG. 13 is a flow chart showing an example of a function selection process;

FIG. 14 shows an example of a determination table;

FIG. 15 shows an example of a physical reference intention vector setup table;

FIG. 16 shows an example of a mental reference intention vector setup table;

FIG. 17 shows an example of setting a physical condition correction factor;

FIG. 18 shows an example of setting a mental condition correction factor;

FIG. 19 shows an example of an intention estimation table;

FIG. 20 shows another portion of the intention estimation table;

FIG. 21 shows an example of a principle-effect table; and

FIG. 22 shows an example of a function extraction table.

DETAILED DESCRIPTION OF THE PREFERRED EMBODIMENTS

Figures 2A, 2B, 3:
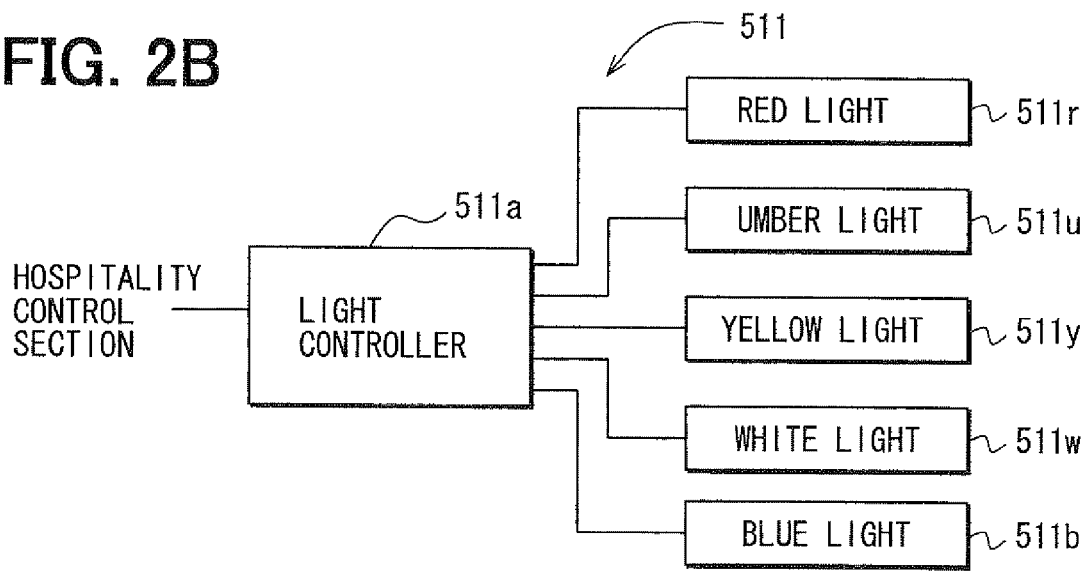
FIG. 2A is an explanatory diagram showing an example of a user registration portion.
FIG. 2B is a block diagram showing an example of an electric structure of vehicle interior lighting.
FIG. 3 is a conceptual diagram showing an example of a structure of lighting control data of a lighting device.

Embodiments of the present invention will be described in further detail with reference to the accompanying drawings. FIG. 1 is a conceptual block diagram showing a vehicular user hospitality system 100 representing an embodiment of the present invention. The vehicular user hospitality system 100 is hereafter also referred to as the system 100. The system 100 is mounted on a vehicle and includes a hospitality control section 3 and a hospitality determination section 2. The hospitality control section 3 includes a first computer connected to various hospitality operating portions 502 to 517, 534, 541, 548, 549, 550, 551, 552, and 1001B. The hospitality determination section 2 includes a second computer connected to various sensors and cameras 518 to 528. The first and second computers have CPUs, ROMs, and RAMs. The first and second computers execute control software stored in the ROMs by use of the RAMs as working memory, to achieve aftermentioned various functions.

In the system 100, motions of a user using a vehicle when the user approaches the vehicle, gets in the vehicle, drives the vehicle or stays in the vehicle, and gets out of the vehicle, are divided into multiple predetermined scenes. In respective divided scenes, the hospitality operating portions 502 to 517, 534, 541, 548, 549, 550, 551, 552, and 1001B operate hospitality for assisting the use of the vehicle by the user, or for entertaining the user. In this embodiment, a horn 502 and a buzzer 503 are connected as devices for generating sound wave to outside the vehicle. As lighting devices (lamps), a head lamp 504 (its beam can be switched between high and low), a fog lamp 505, a hazard lamp 506, a tail lamp 507, a cornering lamp 508, a backup lamp 509, a stop lamp 510, an interior lamp 511, and an under-floor lamp 512 are connected. The other hospitality operating portions connected to the system 100 include an air conditioner 514, a car audio system (car stereo) 515, a power seat handle 516, a driving portion 517 for adjusting angles of side and back mirrors, a car navigation system 534, an assist mechanism (hereinafter called a door assist mechanism) 541 for opening and closing doors, a fragrance generation portion 548 for outputting fragrance in the interior, an ammonia generation portion 549 (mounted at the center of a steering wheel to inject ammonia-containing component toward the face of the driver) for awaking the driver in serious physical condition (including strong sleepiness), a seat vibrator 550 (embedded in a bottom portion or backrest portion of a seat) for warning the driver or awaking the driver from sleepiness, a steering wheel vibrator 551 (mounted to a shaft of the steering wheel), and a noise canceller 1001B for decreasing noise in the vehicle.

FIG. 2B shows an example of a structure of the interior lamp 511. The interior lamp 511 includes multiple light portions (in this embodiment, including a red lamp 511r, an umber lamp 511u, a yellow lamp 511y, a white lamp 511w, and a blue lamp 511b). In response to a control instruction signal inputted from the hospitality determination section 2 to the hospitality control section 3, these light portions are selected, and the lighting of the light portions are controlled in various lighting patterns in accordance with the control signal. FIG. 3 shows an example of a structure of light control data 402 determined in accordance with a character type of the user. The light control data 402 is stored in the ROM of the hospitality determination section 2, read by the control software as needed, and used. For example, with respect to an active character (SKC1, see FIG. 11), the red lamp 511r is selected, and flashes (only at first, then continuously lights). Additionally, with respect to a gentle character (SKC2), the umber lamp 511u is selected, and fades in. These are only part of the examples.

Figure 4:
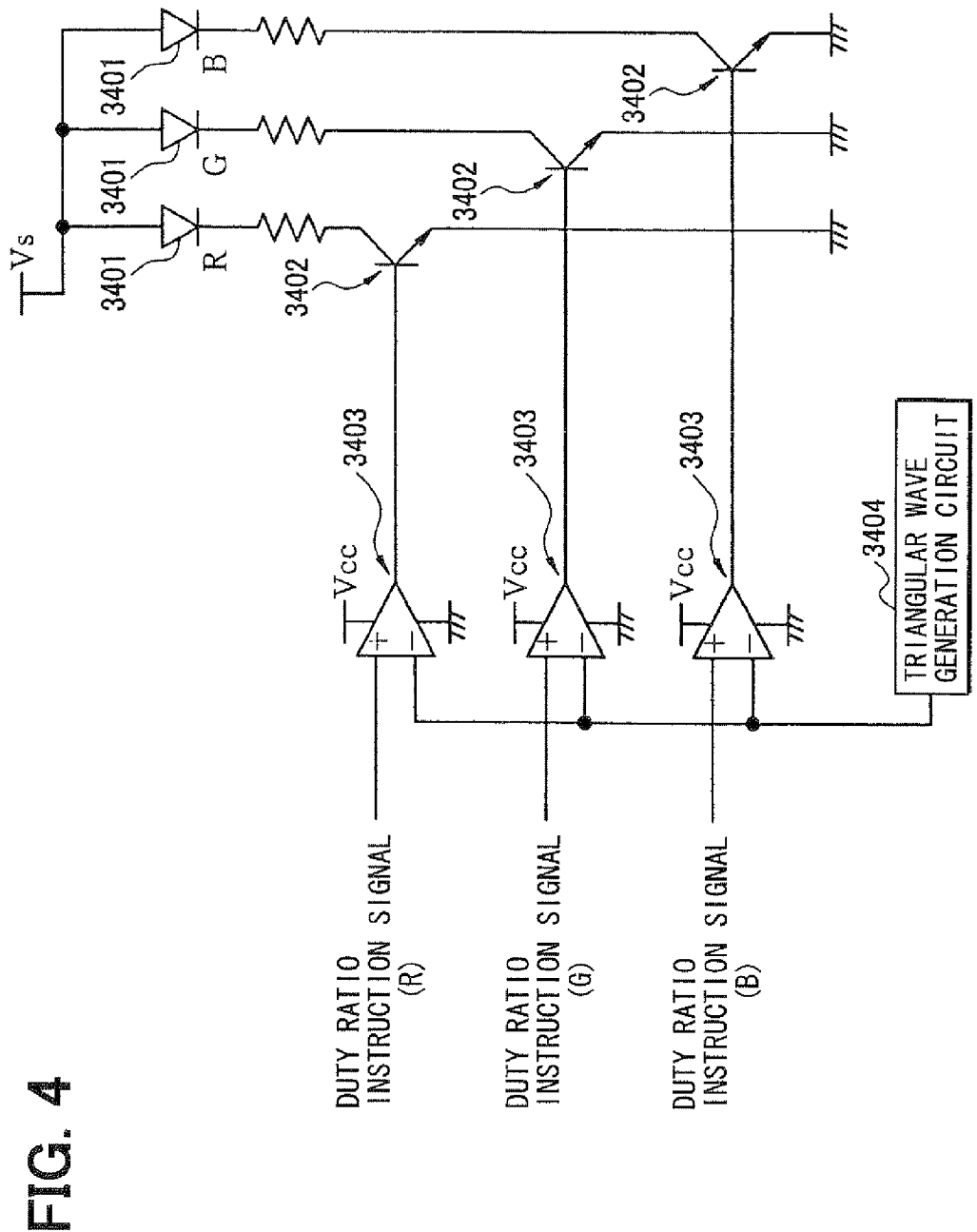
FIG. 4 is a circuit diagram showing an example of a lighting device using a light emitting diode.

The lighting device can use an incandescent lamp, a fluorescent lamp, and a lighting device using a light emitting diode. Especially, light emitting diodes of the three primary colors, red (R), green (G), and blue (B) can be combined to obtain various lights easily. FIG. 4 shows one example of a structure of the circuit. A red light emitting diode 3401 (R), a green light emitting diode 3401 (G), and a blue light emitting diode 3401 (B) are connected to a power supply (Vs), and switched and driven by transistors 3402. This switching is PWM-controlled in accordance with a duty ratio determined by a cycle of a triangular wave (a saw tooth wave may be used) inputted to a comparator 3403 and by a voltage level of an instruction signal. Each input waveform of an instruction signal to each light emitting diode 3401 can be changed separately. Light of arbitrary color can be obtained in accordance with a mixed ratio of the three emitted lights. Colors and light intensity patterns can be changed over time in accordance with an input waveform of an instruction signal. A light emitting intensity of each light emitting diode 3401 can be adjusted by a level of a driving current on the premise of continuous lighting, as well as PWM-controlled. Another method is available by combining this adjustment with the PWM control.

FIG. 5 shows relationship between mixing ratios (in accordance with duty ratios) of red light (R), green light (G), and blue light (B) and viewed colors of the mixed lights. The mixing ratio concerns one color relative to another color assigned with mixing ratio 1. An absolute illumination intensity is specified with reference to the relative mixing ratio. The mixed colors are provided with indexes (0 to 14), which are stored as control reference information in the ROM of the hospitality control section 3. Alternatively, communication may be used to transmit information needed for controlling a storage device 535 of the hospitality determination section 2 to the hospitality control section 3. White light is frequently used. To achieve smooth switches between white light and colored light, multiple indexes of white light appear periodically in the arrangement of all the indexes.

Especially, the white color (index 6) marks the intermediate boundary between warm colors such as pale orange, orange, and red in order and cold colors such as light blue, blue, and bluish purple in order. In accordance with physical and mental conditions of the user, the white light can be switched to warm color light or cold color light smoothly. The white light is used for a normal state having no consideration for specific effects. Each lighting color is assigned with a mental condition index. A larger mental condition index indicates a more elevated mental condition. The white is selected for a moderate mental condition assigned with mental condition index 5. When the mental condition index increases to express an elevated mental condition, the lighting color changes to blue indicating short wavelengths. When the mental condition index decreases to express a depressed mental condition, the lighting color changes to red indicating long wavelengths. The embodiment defines mental condition index 10 as light blue and mental condition index 1 as pale orange in accordance with relative RGB values. The interpolation is used to determine relative RGB values for intermediate mental condition indexes.

Figure 6:
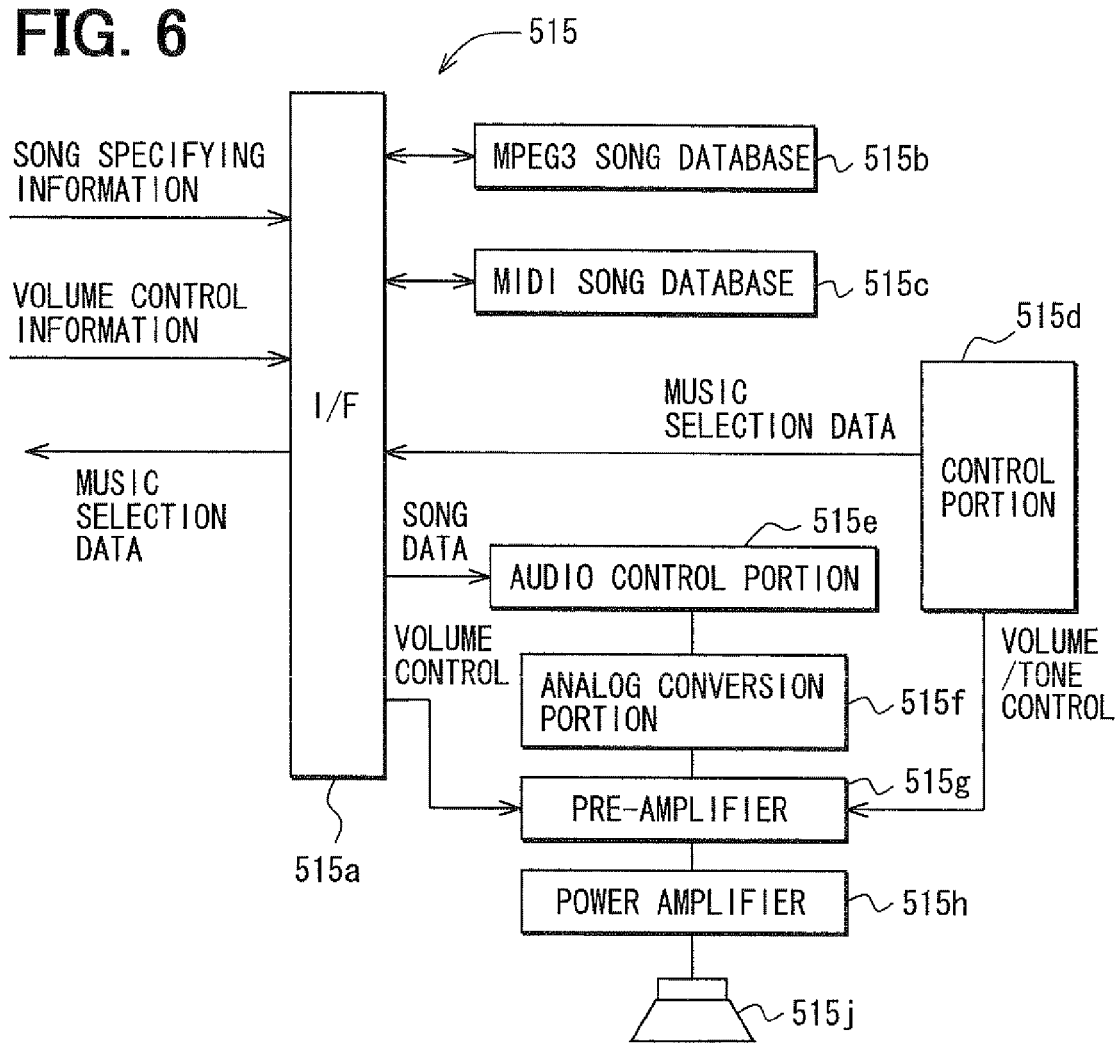
FIG. 6 is a block diagram showing an example of an electric structure of a car audio system.

FIG. 6 shows an example of a structure of the car audio system 515. The car audio system 515 has an interface portion 515*a* that is supplied with hospitality song play control information such as song specifying information and volume controlling information from the hospitality determination section 2 via the hospitality control section 3. The interface portion 515*a* connects with a digital audio control portion 515*e*, and music source databases 515*b* and 515*c* for storing many music source data. The source database 515*b* is used as an MPEG3 database. The source database 515*c* is used as a MIDI database. The music source data selected in accordance with the song specifying information is sent to the audio control portion via the interface portion 515*a*. The music source data is decoded to digital music waveform data in the audio control portion, and converted into analog in an analog conversion portion 515*f*. The music source data is supplied to a preamplifier 515*g* and a power amplifier 515*h* and then is outputted from a speaker 515*j* at a volume specified by the hospitality song play control information.

Now returning back to FIG. 1, the door assist mechanism 541 uses an unshown motor (actuator) to automatically open or close a slide or swing door or assist in opening or closing the same while getting in or out of the vehicle.

Figure 7:
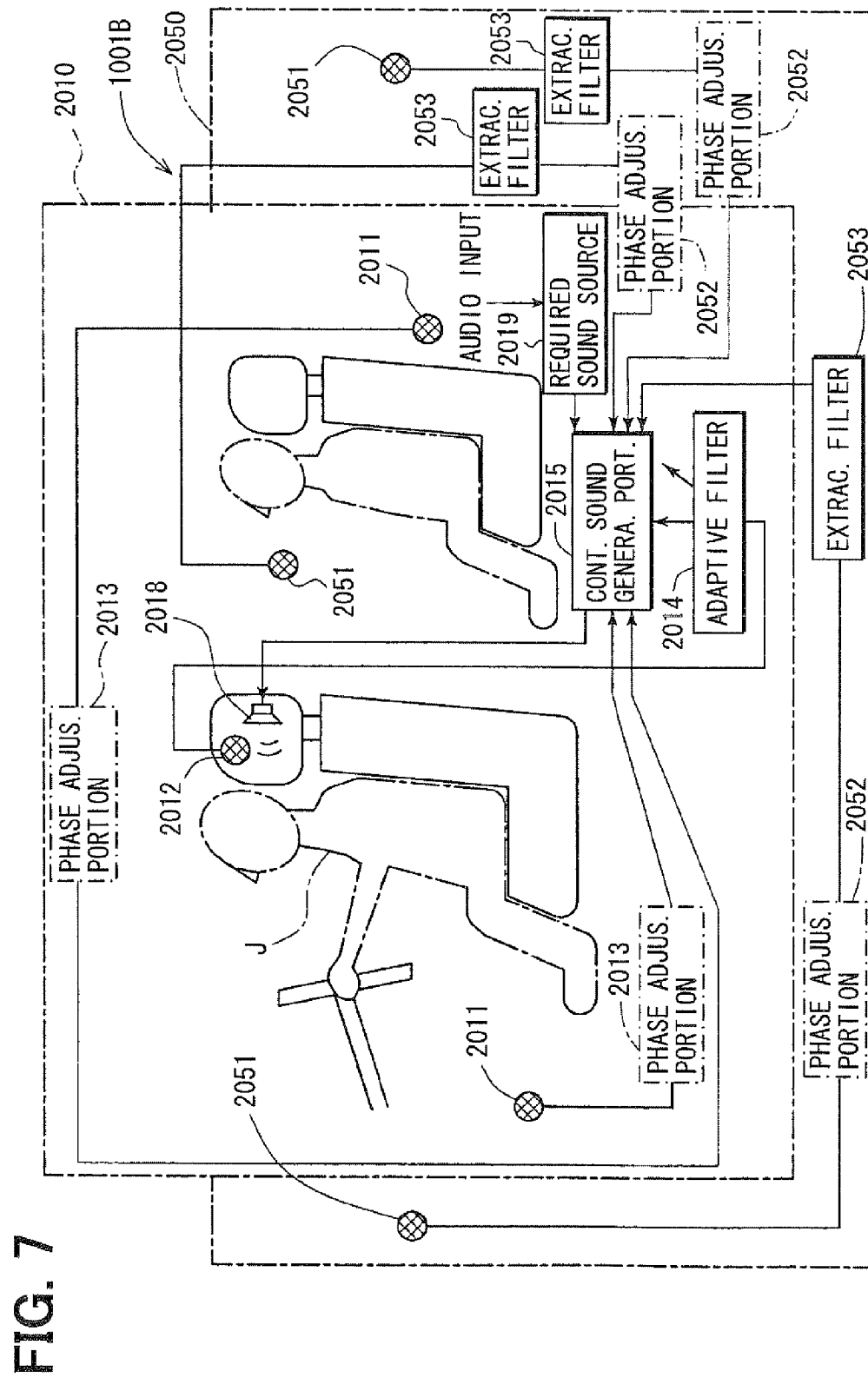
FIG. 7 is a conceptual block diagram showing an example of a structure of a noise canceller.

FIG. 7 is a functional block diagram showing an example of a structure of a noise canceller 1001B. The noise canceller 1001B mainly includes an active noise control mechanism 2010 forming a noise restriction means and a required sound emphasis portion (means) 2050. The active noise control mechanism 2010 has a vehicle interior noise detection microphone (noise detection microphone) 2011 and a noise control waveform synthesis portion (control sound generation portion) 2015. The vehicle interior noise detection microphone 2011 detects a noise intruding into the vehicle. The noise control waveform synthesis portion 2015 synthesizes a noise control waveform having a reverse phase to a noise waveform detected by the vehicle interior noise detection microphone 2011. The noise control waveform is outputted from a noise control speaker 2018. An error detection microphone 2012 and an adaptive filter 2014 are also provided. The error detection microphone 2012 detects a remaining noise element contained inside the vehicle after a noise control sound wave is superimposed. The adaptive filter 2014 adjusts a filter factor to decrease a level of the remaining noise.

The vehicle interior noise generated from the vehicle itself includes an engine noise, a road noise, and a wind noise, for example. The multiple vehicle interior noise detection microphones 2011 are distributed to positions for appropriately detecting respective vehicle interior noises. The vehicle interior noise detection microphones 2011 are positioned differently when viewed from a passenger J. Noise waveforms picked up by the microphones 2011 are quite different in phase from noise waveforms the passenger J actually hears. To adjust the phase difference, detection waveforms of the vehicle interior noise detection microphones 2011 are sent to the control sound generation portion 2015 properly via a phase adjustment portion 2013.

Next, the required sound emphasis portion 2050 includes an emphasized sound detection microphone 2051 and a required sound extraction filter 2053. An extracted waveform of the required sound is sent to the control sound generation portion 2015. In accordance with the same situation as the vehicle interior noise detection microphones 2011, a phase adjustment portion 2052 is provided properly. The emphasized sound detection microphones 2051 include a vehicle exterior microphone 2051 for collecting required sounds outside the vehicle and a vehicle interior microphone 2051 for collecting vehicle interior required sounds inside the vehicle. Both microphones can be formed of known directional microphones. The vehicle exterior microphone is mounted such that a strong directional angular area for sound detection is directed outside the vehicle, and a weak directional angular area is directed inside the vehicle. In this embodiment, the whole of the microphone 2051 is mounted outside the vehicle. The microphone 2051 can be mounted across inside and outside the vehicle so that the weak directional angular area is mounted inside the vehicle and only the strong directional angular area is outside the vehicle. On the other hand, the vehicle interior microphone 2051 is mounted corresponding to each seat to detect a conversation sound of the passenger selectively, so that the strong directional angular area for sound detection is directed to a front of the passenger, and the weak directional angular area is directed opposite the passenger. These emphasized sound detection microphones 2051 are connected to the required sound extraction filter 2053 for sending required sound elements of the inputted waveforms (detected waveforms) preferentially. An audio input of the car audio system 515 of FIG. 6 is used as a vehicle interior required sound source 2019. An output sound from a speaker of this audio device (the speaker may use the noise control speaker 2018, or may be provided separately) is controlled not to be offset even when superimposed with the noise control waveforms.

Figure 8:
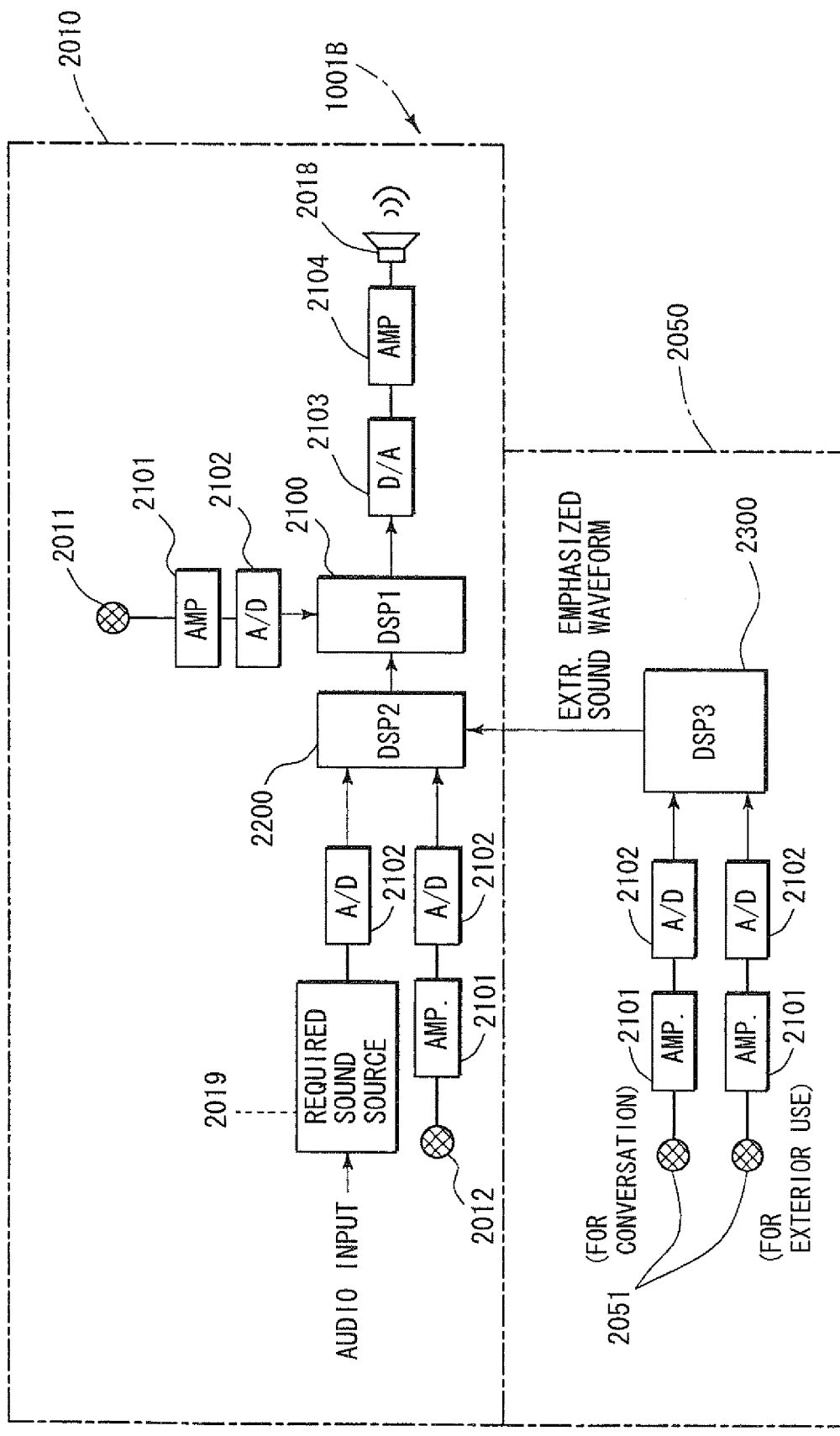
FIG. 8 is a conceptual block diagram showing an example of a structure of hardware of the noise canceller.

FIG. 8 is one example of a hardware block diagram corresponding to the functional block diagram of FIG. 7. A first DSP (Digital Signal Processor) 2100 forms a noise control waveform synthesis portion (control sound generation portion) 2015 and an adaptive filter 2014 (and a phase adjustment portion 2013). The vehicle interior noise detection microphones 2011 are connected to the first DSP 2100 via a microphone amplifier 2101 and an AD converter 2102. The noise control speaker 2018 is connected to the first DSP 2100 via an DA converter 2103 and an amplifier 2104. On the other hand, a second DSP 2200 forms an extraction portion for noise elements to be restricted. The error detection microphone 2012 is connected to the second DSP 2200 via the microphone amplifier 2101 and the AD converter 2102. The sound signal source not to be restricted, such as audio inputs, namely, the required sound source 2019 is connected to the second DSP 2200 via the AD converter 2102.

The required sound emphasis portion 2050 has a third DSP 2300 functioning as the required sound extraction filter 2053. The required sound detection microphone (emphasized sound detection microphone) 2051 is connected to the third DSP 2300 via the microphone amplifier 2101 and AD converter 2102. The third DSP 2300 functions as a digital adaptive filter. A process for setting a filter factor is explained below.

Sirens of emergency vehicles (such as an ambulance, a fire engine, and a patrol car), highway crossing signal sounds, horns of following vehicles, whistles, cries of persons (children and women) are defined as vehicle exterior required sounds (emphasized sounds) to be recognized as danger. Their sample sounds are recorded in, e.g., a disk as a library of readable and reproducible reference emphasized sound data. With respect to conversation sounds, model sounds of the respective plurality of persons are recorded as a library of the reference emphasized sound data as well. When passenger candidates of a vehicle are determined, the model sounds can be prepared as the reference emphasized sound data obtained from the phonation of the candidates. Accordingly, the emphasis accuracy of the conversation sounds can be increased when the candidates get in the vehicle.

An initial value is provided to the filter factor. An emphasized sound detection level by the emphasis sound detection microphone 2051 is set to the initial value. Next, each reference emphasized sound is read and outputted, and detected by the emphasized sound detection microphones 2051. Waveforms passing through the adaptive filter are read. Levels of the waveforms which can pass through the filter are measured. The above process is repeated until the detection level reaches a target value. The reference emphasized sounds of the vehicle exterior sounds and vehicle interior sounds (conversation) are switched one after another. Then, a training process for the filter factor is executed to optimize the detection level of the passing waveform. The required sound extraction filter 2053 having the filter factor adjusted as described above extracts a required sound from waveforms from the emphasized sound detection microphones 2051. The extracted emphasized sound waveform is sent to the second DSP 2200. The second DSP 2200 calculates a difference between an input waveform from the required sound source (audio output) 2019 and an extracted emphasized sound waveform from the third DSP 2300, from a detection waveform of the vehicle interior noise detection microphone 2011.

A filter factor of the digital adaptive filter embedded in the first DSP 2100 is initialized before use of the system. Various noises to be restricted are determined. Sample sounds of the noises are recorded in, e.g., a disk as a library of reproducible reference noises. An initial value is provided to the filter factor. A level of a remaining noise from the error detection microphone 2012 is set to the initial value. The reference noises are read sequentially and outputted, and detected by the vehicle interior noise detection microphone 2011. A detection waveform of the vehicle interior noise detection microphone 2011, the waveform passing through the adaptive filter, is read, and applied the fast Fourier transformation. Accordingly, the noise detection waveform is decomposed to fundamental sine waves each having a different wavelength. Reversed elementary waves are generated by reversing phases of respective fundamental sine waves, and synthesized again, so that a noise control waveform in anti-phase to the noise detection waveform is obtained. This noise control waveform is outputted from the noise control speaker 2018.

When a factor of the adaptive filter is determined properly, only noise elements can be extracted from a waveform of the vehicle interior noise detection microphones 2011 efficiently. The noise control waveform negative-phase-synthesized in accordance with the factor can offset the noise in the vehicle exactly. However, when the filter factor is not set properly, the waveform elements which are not offset is generated as remaining noise elements. These are detected by the error detection microphone 2012. A level of the remaining noise elements is compared to a target value. When the level is over the target value, the filter factor is updated. This process is repeated until the level is equal to or under the target value. Accordingly, the reference noises are switched one after another to execute the training process of the filter factor so that the remaining noise elements are minimized. In case of the actual usage, the remaining noise elements are regularly monitored. The filter factor is updated in real time to always minimize the remaining noise elements, and the same process as above is executed. As a result, while required sound wave elements remain, only a noise level inside the vehicle decreases efficiently.

Now returning back to FIG. 1, a user terminal device 1 is structured as a known mobile phone in this embodiment (hereinafter also called a "mobile phone 1"). The mobile phone 1 is capable of downloading ring tone data and music data for generating a ring tone or replaying the music. The MPEG3 or MIDI data can be used as a ring tone. An unshown music sound synthesis circuit can provide music performance based on the data.

The following sensors and cameras are connected to the hospitality determination section 2. Part of these sensors and cameras function as a scene estimate information obtaining means, and as a biological condition acquisition means.

Vehicle exterior camera 518: This camera captures a user approaching a vehicle, and obtains a gesture and facial expression of the user as static images and moving images. To magnify and capture the user, an optical zoom method using a zoom lens and a digital zoom method for digitally magnifying a captured image can be used together.

Infrared sensor 519: This sensor takes a thermography in accordance with radiant infrared rays from the user approaching the vehicle or from a face of the user in the vehicle. The infrared sensor 519 functions as a temperature measurement portion, which is the biological condition acquisition means, and can estimate a physical and mental condition of the user by measuring a time changing waveform of the temperature.

Seating sensor 520: This sensor detects whether the user is seated on a seat. The seating sensor 520 can include, e.g., a contact switch embedded in the seat of the vehicle. The seating sensor 520 can include a camera capturing the user who has been seated on the seat. In this case, the case where a load other than a person, such as baggage, is placed on the seat, and the case where a person is seated on a seat, can be distinguished from each other. A selectable control is possible. For example, only when a person is seated on the seat, the hospitality operation is executed. By use of the camera, a motion of the user seated on the seat can be detected, so that the detection information can be varied. To detect a motion of the user on the seat, a method using a pressure sensor mounted to the seat is also used.

Figure 9:
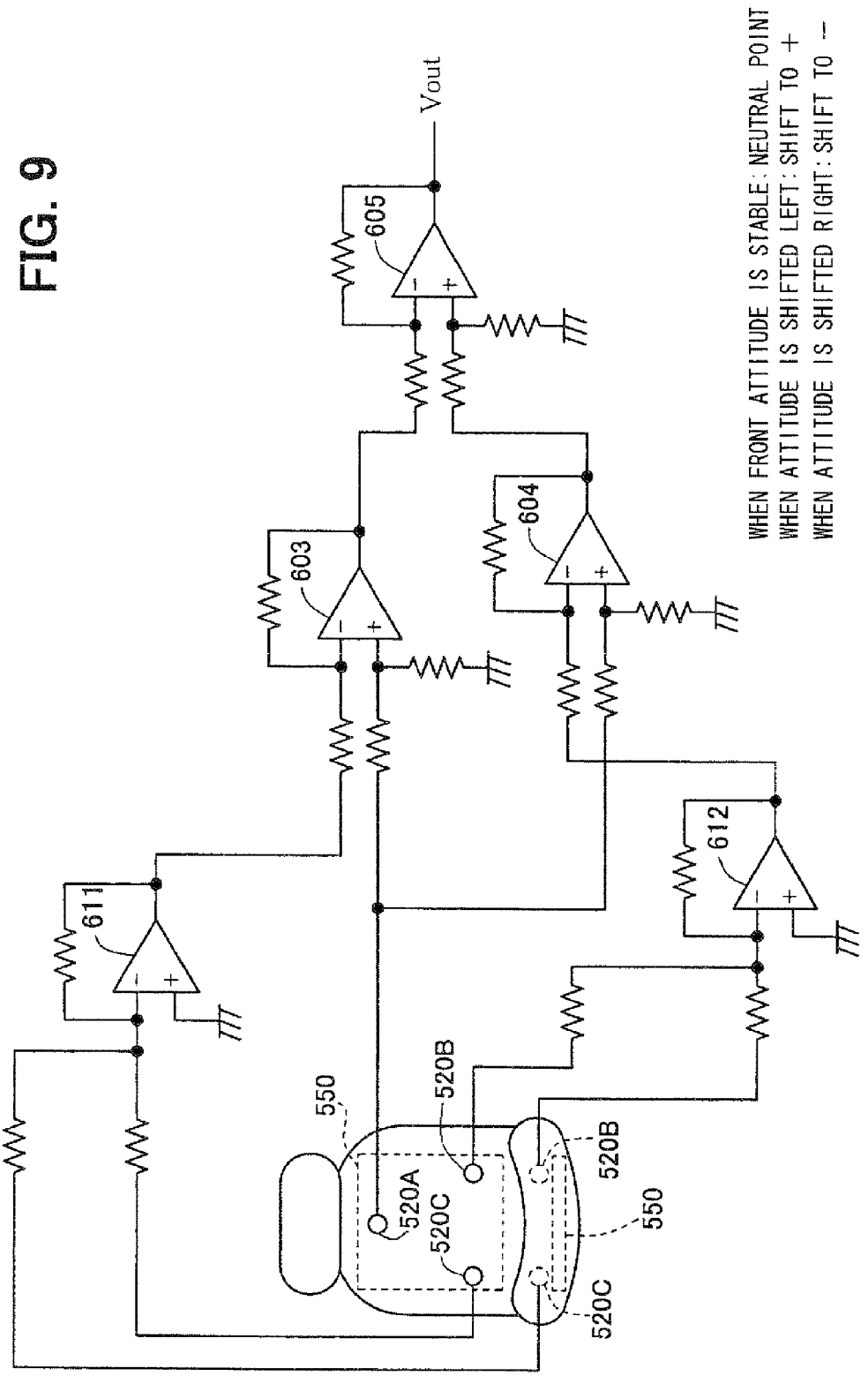
FIG. 9 is a circuit diagram showing an example of hardware generating an attitude signal waveform.

In this embodiment, as shown in FIG. 9, in accordance with detection outputs of seating sensors 520A, 520B, and 520C distributed and embedded in a seating portion and back-rest portion of the seat, a change of an attitude of the user (driver) on the seat is detected as a waveform. The seating sensors are pressure sensors for detecting seating pressures. Especially, the standard sensor 520A is placed on the center of a back of the user who has seated facing a front. The sensors for the seating portion are a left sensor 520B placed on the left of the standard sensor 520A, and a right sensor 520C placed on the right of the standard sensor 520A. A difference between an output of the standard sensor 520A and an output of the right sensor 520C and a difference between an output of the standard sensor 520A and an output of the left sensor 520B are calculated in differential amplifiers 603, 604. The differential outputs are inputted to a differential amplifier 605 for outputting an attitude signal. The attitude signal output Vout (second biological condition parameter) is almost a standard value (here, zero V) when the user is seated facing the front. When the attitude inclines right, an output of the right sensor 520C increases, and an output of the left sensor 520B decreases, so that the attitude signal output Vout shifts to negative. When the attitude inclines left, the attitude signal output Vout shifts to positive. Adders 611 and 612 output additional values resulting from adding seating sensor outputs and back-rest sensor outputs from the right sensor 520C and left sensor 520B. Differences between the seating portion sensors and the back-rest sensor may be outputted (in this case, when the driver is plunged forward, an output of the back-rest sensor decreases, and the differences increases, so that the plunge is detected as a large change of the attitude).

Figure 10:
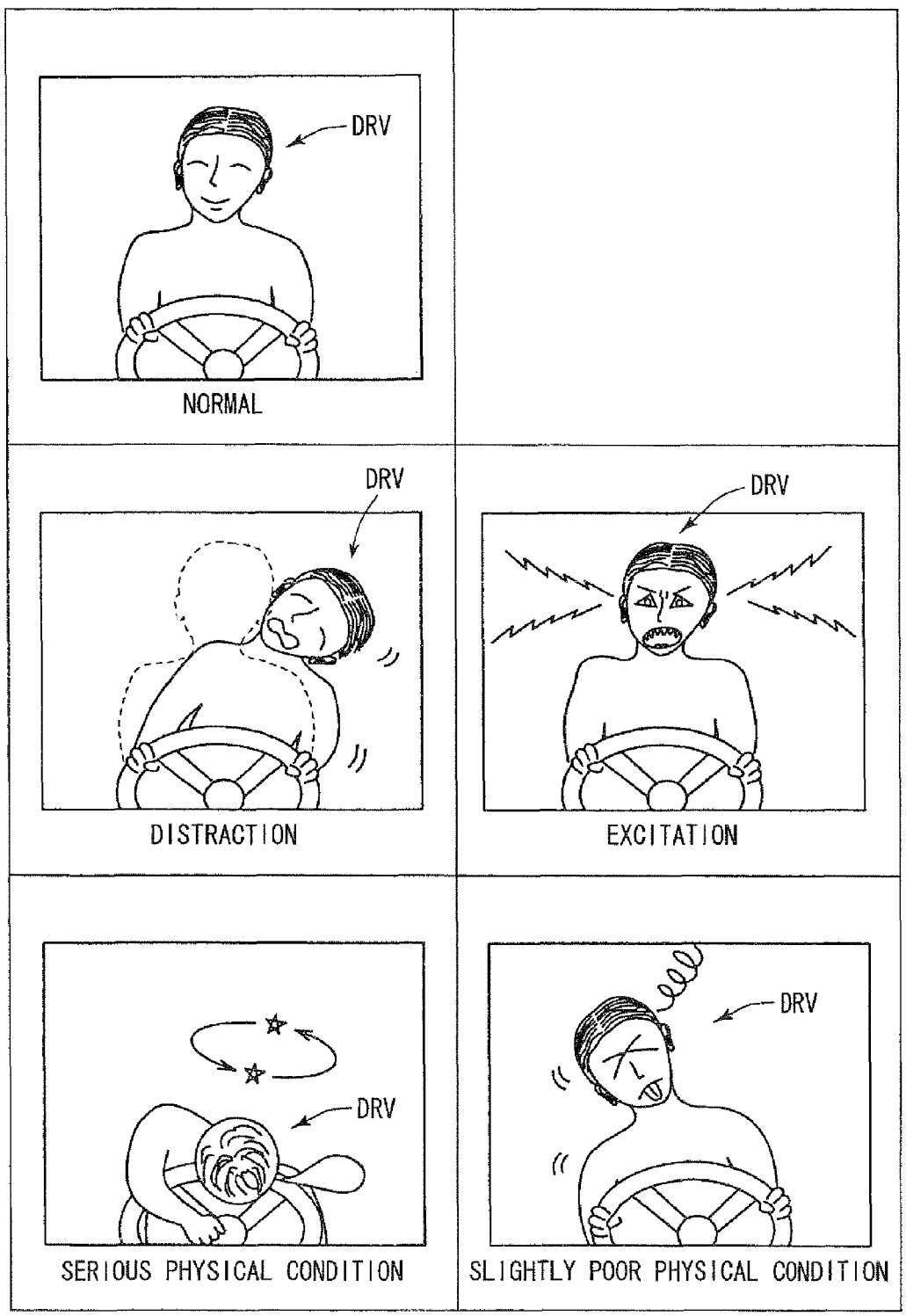
FIG. 10 is a diagram of images of various specified conditions.

Face camera 521: This camera captures a facial expression of the user who has been seated. The face camera 521 is mounted to, e.g., a back mirror, and captures the upper body of the user (driver) who has been seated on the seat, including the face, from diagonally above through a front screen. An image of the face portion is extracted from the captured image. Various facial expressions of the user, shown in FIG. 10, can be specified in comparison with prepared master images that are generated by previously photographing various expressions of the user. The facial expressions are ranked in order of good physical and mental conditions. The facial expressions are provided with points in the order (for example, in case of the mental condition, stability is "1," distraction and anxiety are "2," excitation and anger are "3"). The facial expressions can be used as discrete numeral parameters (second biological parameter). The time change of the facial expressions can be measured as discrete waveforms. As a result, in accordance with the waveforms, the mental or physical condition can be estimated. From a shape of the image of the upper body including the face and a position of the center of gravity on the image, a change of the attitude of the driver can be detected. Namely, a waveform of the change of the position of the center of the gravity can be used as a change waveform of the attitude (second biological condition parameter). In accordance with the waveform, the mental or physical condition can be estimated. The face camera 521 is used for user authentication by use of biometrics, in addition to the source for obtaining the user biological condition information used for the hospitality control. The face camera 521 can magnify and detect a direction of an iris of an eye to specify a direction of the face or eye (for example, when the user looks at a watch frequently, the user is estimated to be upset about time). In accordance with time change waveform of an angle of the eye direction (a direction when the user faces a just front is defined as a standard direction, an angle of the shift to right and left relative to the standard direction is detected as a change of the waveform) (second biological condition parameter), the face camera 521 is also used for estimating the physical or mental condition of the driver.

Microphone 522: This microphone detects a voice of the user, and can also function as the biological condition acquisition means.

Pressure sensor 523: This sensor is mounted to a position grasped by the user, such as a steering wheel or shift lever, and detects a grip of the user and a repeating frequency of the gripping and releasing (biological condition acquisition means).

Blood pressure sensor 524: This sensor is mounted to a user-grasped position of the steering wheel of the vehicle (biological condition acquisition means). A time change of a value of a blood pressure detected by a blood pressure sensor 524 is recorded as a waveform (first biological parameter). In accordance with the waveform, the blood pressure sensor 524 is used for estimating the physical and mental condition of the driver.

Body temperature sensor 525: This sensor includes a temperature sensor mounted to a user-grasped position of the steering wheel of the vehicle (biological condition acquisition means). A time change of a temperature detected by the body temperature sensor 525 is recorded as a waveform (first biological condition parameter). The body temperature sensor 525 is used for estimating the physical and mental condition of the user in accordance with the waveform.

Skin resistance sensor 545: This is a known sensor for measuring a resistance value of the surface of a body due to sweat and is mounted to a user-grasped position of the steering wheel of the vehicle. A time change of a skin resistance value detected by the skin resistance sensor 545 is recorded as a waveform (first biological condition parameter). The skin resistance sensor 545 is used for estimating the physical or mental condition of the driver in accordance with the waveform.

Retina camera 526: This camera takes a retina pattern of the user. The retina pattern is used for a user authentication by use of biometrics.

Iris camera 527: This camera is mounted to, e.g., a back mirror, and takes an image of an iris of the user. The iris image is used for a user authentication by use of biometrics. When an image of the iris is used, characteristics of a pattern and color of the iris is used for the verification and authentication. Especially, the iris pattern is an acquired element and has less genetic influence. Even identical twins have significantly different irises. Accordingly, by use of irises, reliable identifications can be achieved. By use of the identification using iris patterns, recognition and verification are executed rapidly, in which a ratio that a wrong person is recognized is low. In accordance with a time change of a size of a pupil of the driver captured by the iris camera (second biological condition parameter), the physical or mental condition can be estimated.

Vein camera 528: This camera captures a vein pattern of the user, which is used for the user identification by use of biometrics.

Door courtesy switch 537: This switch detects the opening and closing of the door, and is used as a scene estimate information obtaining means for detecting a switch to a scene of getting in the vehicle and to a scene of getting out of the vehicle.

An output of an ignition switch 538 for detecting an engine start is branched and inputted to the hospitality determination section 2. The hospitality determination section 2 also connects with a humidity sensor 546, a room temperature sensor 563, a sunshine sensor 564 for controlling the air conditioner 514, an exterior noise sensor 562 for controlling the noise canceller 1001B, an illumination sensor 539 for detecting a level of an illumination inside the vehicle, and a sound pressure sensor 540 for measuring a sound level inside the vehicle.

An input portion 529 including, e.g., a touch panel (which may use a touch panel superimposed on the monitor of the car navigation system 534: in this case, input information is transmitted from the hospitality control section 3 to the hospitality determination section 2) and a storage device 535 including, e.g., a hard disk drive functioning as a hospitality operation information storage portion are connected to the hospitality determination section 2.

On the other hand, a GPS 533 for obtaining vehicular position information (also used in the car navigation system 534), a brake sensor 530, a speed sensor 531, and an acceleration sensor 532 are also connected to the hospitality control section 3.

The hospitality determination section 2 obtains user biological condition information including at least one of a character, mental condition, and physical condition of the user from detection information from one or more of the sensors and cameras 518 to 528. The hospitality determination section 2 determines what hospitality operation is executed in the hospitality operation device in accordance with contents of the information, and instructs the hospitality control section 3 to execute the determined hospitality operation. The hospitality control section 3 receives the instruction to make the hospitality operation devices 502 to 517, 534, 541, 548, 549, 550, 551, 552, and 1001B execute the hospitality operation. Namely, the hospitality determination section 2 and the hospitality control section 3 operate together to change an operation content of the hospitality operation devices 502 to 507, 534, 541, 548, 549, 550, 551, 552, and 1001B in accordance with the contents of the obtained user biological condition information. A radio communications device 4 forming a vehicular communications means (host communications means) is connected to the hospitality control section 3. The radio communications device 4 communicates with the user terminal device (mobile phone) 1 carried by the vehicle user via a radio communications network.

An operation portion 515d (FIG. 6) manually operated by the user is provided to the car audio system 515. Selected music data is inputted from the operation portion 515d to read desired music source data and play the music. A volume/tone control signal from the operation portion 515d is inputted to the preamplifier 515g. This selected music data is sent from the interface portion 515a to the hospitality determination section 2 via the hospitality control section 3 in FIG. 1, and accumulated as a selected music history data of the storage device 535 connected to the hospitality determination section 2. In accordance with the accumulated contents, the aftermentioned user character determination process is executed (namely, the operation portion 515d of the car audio system 515 forms a function of the biological condition acquisition means).

FIG. 11 shows one example of a database structure of the music source data. Music source data (MPEG3 or MIDI) is stored in the database 401, corresponding to song IDs, song names, and genre codes. In each music source data, a character type code showing a character type (e.g., "active," "gentle," "optimistic," "pessimistic," "decadent," "physical," "intelligent," or "romanticist"), age code (e.g., "infant," "child," "junior," "youth," "middle age," "senior," "mature age," "old," or "regardless of age"), and sex code ("male," "female," and "regardless of sex") of a user who has selected the song are stored. The character type code is one of pieces of the user character specifying information. The age code and sex code are sub classification unrelated to the character. Even when a character of a user can be specified, a music source not suitable for an age and sex of the user is not effective for offering hospitality to the user. To specify suitability of the music source provided to the user, the above sub classification is effective.

A song mode code corresponds to, and is stored in each music source data. The song mode code shows relationship between a mental and physical condition of the user who has selected the song, and the song. In this embodiment, the song mode codes are classified into "uplifting," "refreshing," "mild and soothing," "healing and a wave," and so on. Because the character type code, age code, sex code, genre code, and song mode code are the data referenced when a hospitality content unique to each user is selected, these codes are named hospitality reference data collectively.

As will be described later, each music source data stores a physical condition index PL and a mental condition index SL associated with each other. These indexes are provided in advance so as to specify music source data appropriate to the physical or mental condition indicated by the index. The usage of the indexes will be described later.

The embodiment defines approach, getting-in, preparation, drive, stay, getting-out, and separation scenes. The methods of specifying scenes are disclosed in Patent Documents 1 through 3 in detail and are not described here. To specify a scene, for example, the GPS 554 of a user and the GPS 533 of a vehicle specify a relative distance between the vehicle and the user outside the vehicle and a change of the distance to detect that the user has approached to within a predetermined distance. The getting-in scene and getting-out scene are specified in accordance with a door-opening detection output of the door courtesy switch 537. A scene flag is provided for each scene. In each scene whose coming order is determined in the time sequence, the flag corresponding to the scene is set to "coming (flag value 1)." This makes it possible to specify which scene is in progress currently. The preparation scene and the drive/stay scene are specified in accordance with whether the seating sensor detects a user. The period from the time that the user gets in the vehicle until the user turns on an ignition switch 538, or the period until the user is seated for over a predetermined time although the ignition switch 538 is not turned on, is recognized as the preparation scene. The switch to the separation scene is recognized when the door courtesy switch 537 detects the door closing after the getting-out scene.

Each hospitality operation is controlled by an operation control application of the corresponding hospitality operation device. The operation control applications are stored in the ROM (or the storage device 535) of the hospitality control section 3.

Figure 12C:
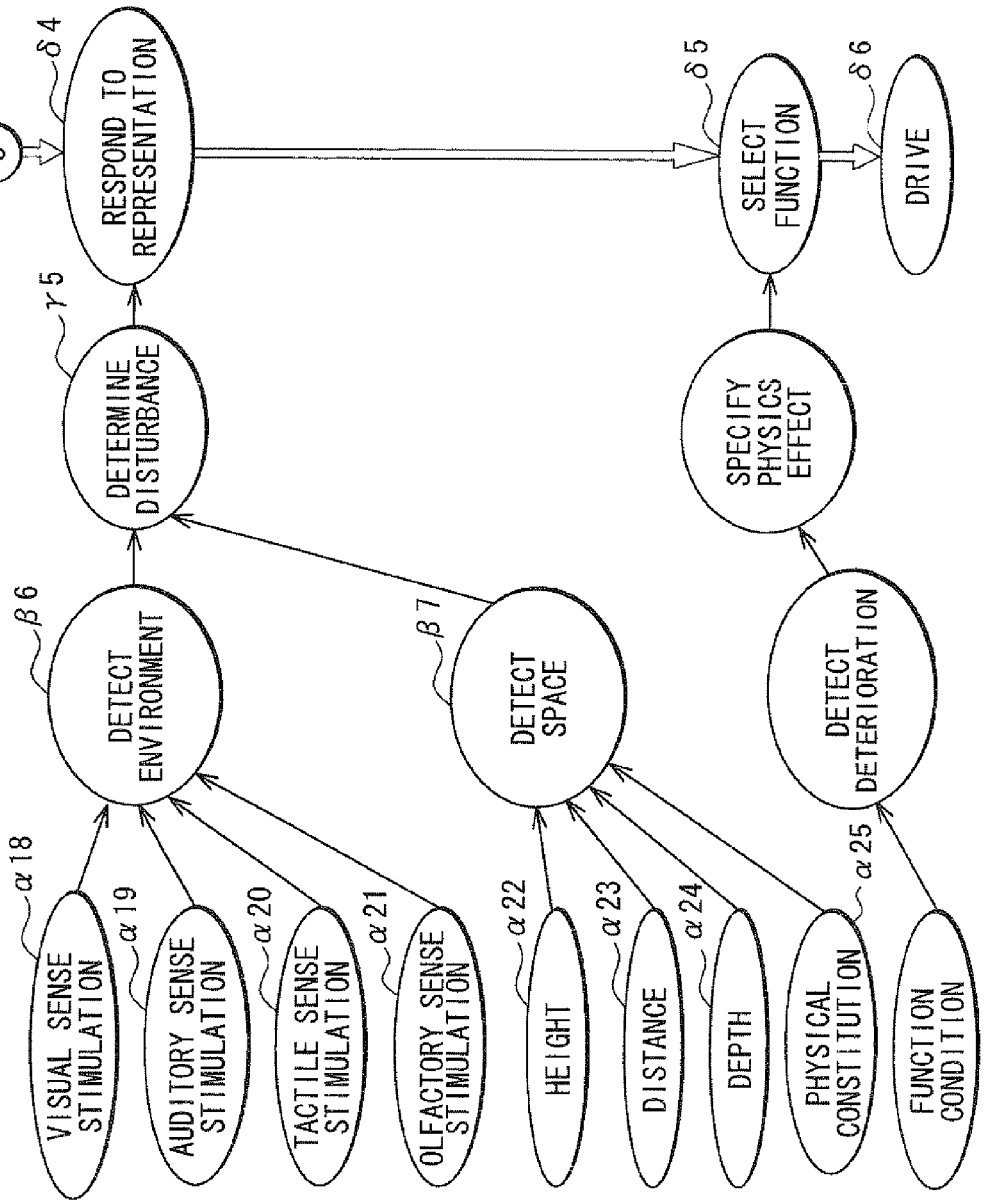
FIG. 12 is a flowchart showing a flow of a main hospitality process.

Operations of a vehicular user hospitality system (hereinafter called just a "system") 100 is explained below. FIG. 12 conceptually shows an overall algorithm of a series of processes from the hospitality determination to the hospitality operation execution (these three drawings are to be read as one drawing by use of the numerals in the circles as connectors). A main hospitality process includes steps such as "object estimate ($\delta 1$)," "character matching ($\delta 2$)," "condition matching ($\delta 3$)," "representation response ($\delta 4$)," "function selecting ($\delta 5$)," and "driving ($\delta 6$)."

The object estimate ($\delta 1$) estimates the current scene in accordance with a user position detection ($\beta 1$) and a user operation detection ($\beta 2$). The user position detection ($\beta 1$) recognizes and specifies relative position relation ($\alpha 1$) between a user and a vehicle. The user position detection ($\beta 1$) can also take into consideration an approaching direction ($\alpha 2$) of the user. The user operation detection ($\beta 2$) basically uses outputs from sensors (scene estimate information obtaining means) that detect predetermined operations for determining scenes such as opening or closing the door or sitting on the seat ($\alpha 5$). The user operation detection ($\beta 2$) can also take into consideration a continuous time ($\alpha 6$) of a specific operation in a case of detecting the transition from the preparation scene to the drive/stay scene based on a continuous sitting time.

When the scene is determined at $\gamma 1$, the process estimates a hospitality intention for each scene at $\delta 1$. As mentioned above, estimating the hospitality intention is equivalent to estimating an optimal hospitality content, that is, a hospitality content of the type most favored by the user in accordance with a varying physical or mental condition of the user. Specifically, the process uses an intention estimation table 371 as shown in FIGS. 19 and 20 and a principle retrieval table 372 (or referred to as a principle-effect table) as shown in FIG. 21. Using these tables, the process determines the presence or absence of a hospitality intention matching an environment item to be controlled for the bodily sensation of the user such as tactile, visual, olfactory, and auditory senses with respect to categories of safety, convenience, and comfort for each scene. When a hospitality intention is retrieved, the process references a function extraction table 373 in FIG. 22 corresponding to each scene and extracts a hospitality function corresponding to the retrieved hospitality intention.

At δ2, the process matches the hospitality content to the user character. This step aims at weighting each hospitality process in accordance with a user character determination process (to be described) and a determined character. That is, the step aims at customizing a combination of hospitality operations as needed or changing the degree of the hospitality operation so as to match each user character. A character detection process β4 is needed to specify a character. The character detection process β4 can use two methods. One is to acquire character categories based on inputs from the user such as a questionnaire process (α7). The other is to more analytically determine character categories based on user behaviors, actions, and thought patterns. Concerning the latter, Patent Documents 1 and 2 use the techniques of determining character categories according to statistics about music selections (α8).

δ3 indicates a process for matching the hospitality content to a mental/physical condition of the user. δ4 indicates a hospitality representation response process. δ5 indicates a function selection process. The process acquires the mental/physical condition information reflecting the mental and physical conditions of the user based on detection information from the biological condition acquisition means. The process estimates the mental or physical condition of the user in accordance with the acquired content. More particularly, the process calculates a physical condition index and a mental condition index from biological user information acquired from the user. The process further computes a user state index G based on the physical condition index or the mental condition index.

The biological condition acquisition means may use the infrared sensor 519 for detecting complexion at α17, the face camera 521 for detecting expression at α9, attitude at α11, line of sight at α12, and pupil diameter at α13, and the blood pressure sensor 524 for detecting a heart rate at α14 using an electrocardiograph. In addition, the biological condition acquisition means may use the sensors 502w, 530, 531, 532, 532a, and an operational error ratio at α10 for detecting driving operation achievements, the blood pressure sensor at α15, and the seating sensor 520. In the seating sensor 520, the pressure sensor measures a weight distribution on the seat, detects small weight shifts to determine loss of calm in driving, and detects a biased weight to determine a level of fatigue of a driver. The details will be described later.

The process replaces an output from the biological condition acquisition means with a numeral parameter indicating the mental or physical condition (β5). The process estimates the mental or physical condition of the user from the numeral parameter and its chronological change (γ3 and γ4). The estimation result is used for a process that determines a reference intention parameter to be described later. The reference intention parameter value is used for a process that extracts the hospitality function and determines a control content using the intention estimation table 371 (FIGS. 20A and 20B) and the principle retrieval table 372. The reference intention parameter is set to a specific value that reflects the estimated mental or physical condition. A function to be selected and its control content are optimized accordingly so as to match the estimated mental or physical condition of the user. Depending on different user characters, the hospitality for the same scene is fine-tuned so that the hospitality operation matches the character. The type or degree of a function to be selected is adjusted for the same user depending on the mental or physical conditions, Let us take the illumination light as an example. Users prefer different lighting colors depending on the characters. An active user tends to prefer red. A gentle user tends to prefer blue. A user often makes different requests for illumination intensities depending on physical conditions. For example, the user requests to reduce the light volume for suppressing the stimulation due to the illumination in a bad physical condition. The former concerns the lighting color and requires the hospitality control that adjusts frequencies or wavelengths of the illumination light. The wavelengths decrease in the order of red, green, and blue. The latter concerns the illumination intensity and requires the hospitality control that adjusts amplitudes of the illumination light. Mental conditions concern both controls. A slightly cheerful mental condition may need a red-based illumination light for further uplifting the mood (frequency adjustment) or increase the brightness without changing the illumination light (amplitude adjustment). An excessively excited state may need to use a blue-based illumination light for calming the state (frequency adjustment) or decrease the brightness without changing the illumination light (amplitude adjustment). The music concerns more complicated issues because various frequency components are included. An awakening effect can be increased by emphasizing high-frequency sound waves of several hundreds to tens of kilohertz. The control to calm the mental condition may use so-called alpha-wave music that combines brain waves (alpha waves) at 7 Hz to 13 Hz frequencies for human resonance in a relaxed condition with the center frequency of the sound wave. Frequencies and amplitudes can be used to select the control patterns likewise.

Outputs from the illumination sensor 539 (visual sense stimulation at α18) and the sound pressure sensor (auditory sense stimulation at α19) in FIG. 1 are used to acquire information (disturbance stimulation) about the degree of the stimulation currently felt by the user (environment estimation at β6) and estimate the disturbance stimulation value (γ5). Disturbance stimulations to be specified may include tactile sense stimulation detected at α20 by the pressure sensor 523 attached to the steering wheel and olfactory sense stimulation detected at α21 by the olfactory sensor. The disturbance estimation may take into consideration an indirect stimulation from a space surrounding the user (space detection at β7). Specifically, the disturbance estimation may take into consideration a height (α22), a distance (α23), a depth (α24), and a physical constitution of the user or a passenger (α25).

For example, the following method can be used to categorize user characters.

A vehicle user is previously registered in a user registration portion 600 (FIG. 2A) formed in the ROM of the hospitality determination section 2 in FIG. 1. Rewritable flash ROM is desirable for the ROM. The user registration portion is registered so as to associate each user name or a user ID and a security code with the character type. As will be described later, the character type can be determined based on music selection statistics in the car audio system. The statistics are stored while the user is using the vehicle. However, the music selection statistics are insufficient immediately after the user begins to use the vehicle. There may be a need for estimating the character type without collecting the operation history information. In such cases, the user may be allowed to input the character type information or information needed for specifying the character type information. The character type may be determined based on the input result.

For example, a monitor 536 in FIG. 1 displays a character type. A monitor in the car navigation system 534 may substitute for the monitor 536. The user can select an appropriate character type and input it from the input portion 529. A questionnaire may be provided for determining character types instead of directly input character types. In this case, the monitor 536 displays questionnaire items. The user chooses from among choices to respond to the questionnaire. A selection button 529B represents a choice. The selection button 529B is overlaid with a touch panel 529. The user touches a targeted position on the touch panel 529 to enter the choice. Responding to all the questionnaire items uniquely determines one of character types predetermined for combinations of choices.

The input portion 529 is also used for the user registration including user names. The user registration portion 600 in FIG. 2A stores the input user registration as well as the determined character type, a rank order, and physical condition correction factors Dfb and Dfm (to be described). The mobile phone 1 can be also used for a series of these input operations. In this case, the input information is wirelessly transferred to the vehicle. When the user purchases a vehicle, a dealer may use the input portion 529 or a special input tool to register the user in advance.

Patent Documents 1 through 3 disclose cases of determining character types based on statistical information about the song selection history from the car audio system. The outline is described below. In the car audio system 515 of FIG. 6, the user can use the operation portion 515d to select a favored song and enjoy the performance at any time. A selected music history storage portion is formed in the storage device 535 in FIG. 1. When the user selects a song, the selected music history storage portion stores specific information about the user such as the user name or the user ID, an ID of the selected music source data, and the hospitality reference data RD such as the character type code, age code, sex code, genre code, and song mode code in association with each other. The selected music history storage portion creates information is stored in the storage device in FIG. 1. The statistical information counts selected music data in accordance with character type codes. The statistical statistical information about the song selection history on a user basis. The statistical information uses a numeral parameter to indicate which character type corresponds to the most frequently selected song. A simplest process can assume that the user character is represented by the character type corresponding to the most frequently selected song. When a selected music history count stored in the statistical information reaches a given level, the character type initially specified by the user may be replaced by the character type assumed from the statistical information as mentioned above.

The user needs to be authenticated before using the vehicle. When multiple users are registered, different character types are specified depending on users and hospitality contents also differ. According to a simplest authentication method, the mobile phone 1 transmits the user ID and the security code to the vehicle. The hospitality determination section 2 receives the user ID and the security code and collates the received user ID and the security code with the registered user ID and security code. A biometric authentication technique may be used to collate a facial portrait captured by a camera provided for the mobile phone 1 or to authenticate voices and fingerprints. Alternatively, when the user approaches the vehicle, the simple authentication may be provided using the user ID and the security code. After the user unlocks the door and gets into the vehicle, the biometric authentication may be provided using the face camera 521, the microphone 522, the retina camera 526, the iris camera 527, and the vein camera 528.

The following describes specific operations of the hospitality system according to the invention in accordance with a flow chart in FIG. 13 by taking the drive/stay scene as an example. The system estimates a mental condition and a physical condition of the sitting user ($\gamma 3$ and $\gamma 4$ in FIG. 12). Patent Documents 1 through 3 disclose specific methods in detail. Only the outline is described below. Basically, the system measures a chronological change in the acquired biological condition parameter and estimates a mental condition and a physical condition from the change waveform.

When "expressions" is used as a biological condition parameter, the system uses the face camera 521 in FIG. 1. The system captures face images at a specified sampling interval and compares the captured images with master images to identify expression types such as "stability," "distraction and anxiety," and "excitation and anger." The system determines the chronological change to be "small," "large," "slightly large," or "very large."

When "body temperatures" is used as a biological condition parameter, the system uses the body temperature sensor 525 (infrared sensor 519). Specifically, the system samples body temperatures detected at sampling timings based on a specified time interval and records the body temperatures as a waveform. The system applies a known fast Fourier transform to the waveform to find a frequency spectrum. The system computes a center frequency or a peak frequency of the spectrum. The system divides the waveform into the specified number of sections and computes an average body temperature for the sections. The system computes an integral amplitude for each section using the average body temperature as a center line of the waveform. The system averages integral amplitudes for the sections to determine a representative value for the waveform amplitudes. The system checks whether or not a determined frequency f is larger than a upper bound threshold value fu0. When the determined frequency f is larger than the upper bound threshold value fu0, the system determines that a change in the body temperature under monitoring is "sudden." The system checks whether or not the frequency f is larger than a lower bound threshold value fL0 (>fu0). When the frequency f is larger than the lower bound threshold value fL0, the system determines that a change in the body temperature under monitoring is "slow." Under the condition of fu$0 \geq f \geq$fL0, the system determines that a change in the body temperature under monitoring is "standard." The system compares an integral amplitude A (average value) with a threshold value A0. Under the condition of A>A0, the system determines that a change in the body temperature under monitoring is "variational." Under the condition of A$\leq$A0, the system determines that a change in the body temperature under monitoring is "maintained (stable)."

When "blood pressure" is used as a biological condition parameter, the system computes a center frequency (or peak frequency) f for blood pressure waveforms detected by the blood pressure sensor 524 and an average value A of integral amplitudes A1 and A2 for the sections. When the frequency f is larger than the upper bound threshold value fu0, the system determines that a change in the blood pressure under monitoring is "sudden." When the frequency f is smaller than the lower bound threshold value fL0 (>fu0), the system determines that a change in the blood pressure under monitoring is "slow." Under the condition of fu0≧f≧fL0, the system determines that a change in the blood pressure under monitoring is "standard." The system compares an amplitude A with a threshold value A0. Under the condition of A≦A0, the system determines that the average blood pressure level under monitoring is "maintained." Otherwise, the system determines that the average blood pressure level under monitoring is "variational." When the change of the detected blood pressure value is sudden and "variational," the mental condition can be assumed to be "distraction." When the blood pressure varies slowly, the physical condition can be assumed to be poor. When the blood pressure varies suddenly, the condition can be assumed to be "excitation (anger)."

When "skin resistance" is used as a biological condition parameter, the system uses the skin resistance sensor 545. Similarly, the system samples skin resistance values and records the values as a waveform. The system computes a center frequency (or peak frequency) f for the spectrum and integral amplitudes A1 and A2 for the sections. The system plots integral amplitude A for the sections with reference to time t and performs a least-square regression to find gradient α. When the frequency f is larger than the upper bound threshold value fu0, the system determines that a change in the skin resistance under monitoring is "sudden." When the frequency f is larger than the lower bound threshold value fL0 (>fu0), the system determines that a change in the skin resistance under monitoring is "slow." Under the condition of fu0≧f≧fL0, the system determines that a change in the skin resistance under monitoring is "standard." Further, the system compares an absolute value for the gradient a with threshold value α0. Under the condition of |α|≦α0, the system determines that a level of the skin resistance under monitoring is "constant." When |α|>α0 and the sign for α is positive, the system determines that the level of the skin resistance under monitoring is "increasing." When |α|>α0 and the sign for α is negative, the system determines that the level of the skin resistance under monitoring is "decreasing." When a change in the detected skin resistance value is sudden and "increasing," the mental condition can be assumed to be "distraction." A slightly poor physical condition hardly affects a chronological change of the skin resistance. When a poor physical condition progresses, however, a change in the skin resistance value gradually increases. The skin resistance is useful for estimation of "serious physical condition." When a skin resistance value decreases suddenly, the condition of "excitation (anger)" can be considerably accurately estimated.

When "attitude" is used as a biological condition parameter, the system uses an attitude signal from the multiple seating sensors 520 embedded in the seat. The system computes a center frequency (or peak frequency) f for attitude signal waveforms, average value An of integral amplitudes A1 and A2 for the sections, and variance $\Sigma^2$. When the frequency f is larger than the upper bound threshold value fu0, the system determines that a change speed of the attitude under monitoring is "increasing." When the frequency f is larger than the lower bound threshold value fL0 (>fu0), the system determines that a change speed of the attitude under monitoring is "decreasing." The system compares the average value An of integral amplitudes A with a predetermined threshold value and determines an attitude change amount to be "small," "slight increase," and "sudden increase." When an average value An is large, the attitude change amount tends to increase. When a value of variance $\Sigma^2$ is greater than or equal to a threshold value, the system determines that the attitude change amount tends to increase. Attitude changes indicate remarkably different tendencies depending on basic states to be specified such as "poor physical condition," "distraction," and "excitation." This parameter is particularly useful for distinguishing these states from each other. When the physical condition is normal, the user, while driving, maintains a sense of tension needed for driving by appropriately keeping his or her attitude. When a poor physical condition occurs, however, a gesture for changing the attitude becomes marked to lessen the stress. The attitude change amount tends to slightly increase. When the poor physical condition further progresses or the user feels very sleepy, the attitude becomes unstable and the user starts to totter. The attitude change amount tends to increase and decrease. Because the attitude change at this time is uncontrollable and unstable, a speed of the attitude change decreases considerably. In case of the distractions the attitude change increases and decreases loosely, Since the body can be controlled, a difference is seen in that the attitude change speed does not decrease considerably. In case of the excitation, the user becomes restless and nervous. The attitude change increases rapidly. The change speed becomes high.

When "line-of-sight angle" is used as a biological condition parameter, the system specifies a pupil position and a face center in the face image. In addition, the system computes a deviation of the pupil from the face center in the front direction to find line-of-sight angle θ and acquire its chronological change waveform. Similarly, the system computes a center frequency (or peak frequency) f for waveforms, average value An of integral amplitudes A1 and A2 for the sections, and variance $\Sigma^2$. When the frequency f is larger than the upper bound threshold value fu0, the system determines that a change speed of the line-of-sight angle θ under monitoring is "increasing." When the frequency f is larger than the lower bound threshold value fL0 (>fu0), the system determines that a change speed of the line-of-sight angle θ under monitoring is "decreasing." Under the condition of fu0≧f≧fL0, the system determines that a change speed of the line-of-sight angle θ under monitoring is "normal." The system compares the average value An of integral amplitudes A with a predetermined threshold value and determines a change amount of line-of-sight angle θ to be "small," "slight increase," or "sudden increase." When the average value An is large, the change amount of line-of-sight angle θ tends to increase. When a value of variance $\Sigma^2$ for A is greater than or equal to a threshold value, the system determines that the change of the line-of-sight angle θ tends to increase. That is, the system determines that the condition is "out of order" characterized by shifty eyes. In case of the distraction, a change amount of the line-of-sight angle θ increases rapidly and the eyes rove. Accordingly, the change amount is an important determining factor to estimate the distraction. In case of the poor physical condition, the line-of-sight change amount decreases in accordance with a degree of the poor physical condition. Accordingly, the change amount is an important determining factor to estimate the poor physical condition. The line-of-sight change amount decreases in case of the excitation. In case of the poor physical condition, when a change occurs in a visual range, it is difficult for the line-of-sight to follow the change, and the line-of-sight change speed decreases. In case of the excitation, the user immediately responds to and stares at a change in a visual range. The line of sight sometimes changes at a very high speed. The poor physical condition and excitation can be distinguished from each other.

When "pupil diameter" is used as a biological condition parameter, the system uses the iris camera 527 (FIG. 1) to capture an iris of the user. The system determines a pupil diameter d in the image and acquires its chronological change waveform. From the waveform, the system computes an average pupil diameter dn for the sections, average value An of integral amplitudes A1 and A2 for the sections, and variance $\Sigma^2$. When the average pupil diameter dn is larger than threshold value d0, the system recognizes "open pupil." When the average pupil diameter dn is not larger than threshold value d0, the system checks whether or not the variance $\Sigma^2$ is larger than threshold value $\Sigma^2 0$. When the variance $\Sigma^2$ is larger than threshold value $\Sigma^2 0$, the system recognizes "varying pupil diameter." When the variance $\Sigma^2$ is not larger than threshold value $\Sigma^2 0$, the system recognizes "normal condition." The pupil diameter d remarkably varies with the mental condition of the user. The system can highly accurately estimate whether or not the user is excited based on whether or not the pupil is opened specifically. When the pupil diameter varies, the system can recognize that the user is distracted.

When "steering operation state" is used as a biological condition parameter, the system samples and evaluates the steering operation during linear running. Specifically, the system reads a current steering angle $\phi$ that is output from a steering angle sensor 547 at sampling timings based on a specified time interval. A deflection angle is defined as being left or right from $\phi=0$ degrees indicating that the steering wheel is neutral to drive the vehicle straight. For example, a rightward angle is defined as being positive, and a leftward angle is defined as being negative. The system acquires the steering angle as a waveform and computes a center frequency (or peak frequency) f, integral amplitudes A1 and A2 for the sections, and variance $\Sigma^2$. When the frequency f is larger than the upper bound threshold value fu0, the system determines that a change speed of the steering angle $\phi$ is "increasing." When the frequency f is smaller than the lower bound threshold value fL0 (>fu0), the system determines that a change speed of the steering angle $\phi$ is "decreasing." Under the condition of $fu0 \geq f \geq fL0$, the system determines that a change speed of the steering angle $\phi$ is "normal." When the variance $\Sigma^2$ of the integral amplitude A is larger than the threshold value $\Sigma^2 0$, the system determines that a steering error is "increasing." When the variance $\Sigma^2$ is not larger than the threshold value $\Sigma^2 0$, the system determines that a steering error is "normal." By detecting an increasing steering error, the system can estimate that the driver is distracted or excited. A normal steering operation is hindered when a seriously poor physical condition occurs including a sleepy state. This situation can be estimated according to the tendency of an increasing steering error. A poor physical condition or a decreased concentration tends to slow down a response to the steering operation. This situation can be estimated according to a decreased steering speed. The user, when excited and irritated, tends to make a sharp turn. This situation can be estimated according to an increased steering speed.

By use of the determination results of time changes of the obtained biological condition parameters, concrete mental or physical condition of the user is determined (estimated). Concretely, a determination table 1601 is stored in the storage device 535 as shown in FIG. 14. The determination table 1601 stores combinations of multiple specified conditions and chronological changes of the biological condition parameters in association with each other. Each specified condition is a combination of mental and physical conditions to be determined for the user. The multiple biological condition acquisition means are designed to detect the biological condition parameters so that each of the specified conditions is satisfied.

As the specified conditions according to the embodiment, the physical conditions include "normal," "tired (or fatigue)," "slight abnormal (or slight anomaly)," and "considerably abnormal (or serious anomaly)." The mental conditions include "disappointment," "neutrality," and "passion or excitation." The "neutrality" is subdivided into "soothing," "center (or intermediate)," and "uplifting." The determination table 1601 contains setting examples of values for the physical condition index PL and the mental condition index SL corresponding to the respective specified conditions. The biological condition parameters include "blood pressure," "body temperature," "skin resistance," "expression," "attitude," "line of sight," "pupil (size)," and "steering" as well as those used for scenes to be described later. When the same parameter is used, an appropriate sensor or camera is selected so as to be effective for acquiring a targeted biological condition parameter.

Specifically, the system reads determination results such as "sudden decrease" and "increase" concerning chronological changes of the biological condition parameters. The system collates each read determination result with the combination of chronological changes corresponding to each specified condition in the determination table 1601. In this case, the process may select only the specified condition that results in a match between the information to be collated and the determination result with respect to all the biological condition parameters. When there are many biological condition parameters to be referenced, however, the information to be collated rarely matches the determination result with respect to all the biological condition parameters. It is difficult to flexibly estimate the physical or mental condition of the user. As an effective method, a collation counter generates a score (N). The score is assumed to be a "degree of coincidence." The specified condition is settled when it shows the highest score, that is, the largest degree of coincidence.

When an average blood pressure level is determined to be "varying (or variational)," the state of the same biological condition parameter may positively contribute to establishment of multiple specified conditions such as "distraction" or "excitation." In this case, the process increments the collation counters for the specified conditions. When an average blood pressure level is determined to be "variational," for example, the process increments four collation counter values N1, N4, N5, and N6.

As mentioned above, a match or a mismatch between the information to be collated and the determination result is mostly based on the comparison with the threshold value for the biological condition parameter such as a frequency or an amplitude. When a match or a mismatch is determined on a two-valued or black-or-white basis as mentioned above, such determination nullifies information about a difference between the actual parameter value and the threshold value. Actually, the determination may be "gray" when a match or a mismatch is determined based on a value approximate to the threshold value. Such determination is contrasted with the determination of a match or a mismatch based on a value greatly different from the threshold value. The former determination is requested to moderately contribute to the determination result.

A method to solve this problem substitutes for the method of incrementing the collation counter only when the information to be collated completely matches the determination result. A determination result may not show the complete match but may approximate to the match within a specified range. Such result is limited to a score smaller than the complete match. The score is added to the collation counter. When the information to be collated indicates "sudden increase," the determination adds three points when also indicating "sudden increase," two points when indicating "increasing," or one point when indicating "slight increase," for example.

Now referring back to FIG. 13, the process proceeds to S2 when the physical condition and the mental condition are specified. The process then determines a reference intention parameter value for physical conditions corresponding to the specified physical condition. According to the embodiment, the reference intention parameter for physical conditions is a spatial parameter containing five components fb1 through fb5. The components are represented as [fb]≡[fb1, . . . , fb5] and are hereafter referred to as a physical reference intention vector. Of the five components, fb1 and fb2 belong to a parameter type that indicates an intention intensity concerning exhaustion reduction; and fb3, fb4, and fb5 belong to a parameter type that indicates an intention intensity concerning reconditioning. Specifically, fb1 corresponds to an intention to "reduce energy or time;" and fb2 corresponds to an intention to "reduce labor hour or manpower." fb3 corresponds to an intention to "replenish;" fb4 corresponds to an intention to "rest;" and fb5 corresponds to an intention to "improve effect."

At S3, the process determines a mental reference intention parameter value corresponding to the specified mental condition. According to the embodiment, the mental reference intention parameter is a spatial parameter containing seven components fm1 through fm7. The components are represented as [fm]≡[fm1, . . . , fm7] and are hereafter referred to as a mental reference intention vector. Of the seven components, fm1 and fm2 belong to a parameter type that indicates an intention intensity concerning unpleasantness elimination. fm3 and fm4 belong to a parameter type that indicates an intention intensity concerning pleasantness acquisition. fm5 belongs to a parameter type that indicates an intention intensity concerning mood elevation. fm6 and fm7 belong to a parameter type that indicates an intention intensity concerning mood calming. Specifically, fm1 corresponds to an intention to "eliminate an object or a source of stress." fm2 corresponds to an intention to "dissemble or make insensitive to a stress." fm3 corresponds to an intention to "obtain an object or recognize a favorite or an image." fm4 corresponds to an intention to "dissemble or enjoy a different favorite atmosphere." fm5 corresponds to an intention to "elevate a mood or emphasize an image of the vehicle or the destination." fm6 corresponds to an intention to "to be comforted." fm7 corresponds to an intention to "enhance an effect."

A physical reference intention vector setup table 601 in FIG. 15 contains setting values for the components of the physical reference intention vector [fb] corresponding to the physical conditions. The physical reference intention vector setup table 601 is stored in the ROM of the hospitality determination section 2 in FIG. 1. A value corresponding to the determined physical condition is read and used as needed. A mental reference intention vector setup table 602 in FIG. 16 contains setting values for the components of the mental reference intention vector [fm] corresponding to the mental conditions. The mental reference intention vector setup table 602 is stored in the ROM of the hospitality determination section 2 in FIG. 1. A value corresponding to the determined mental condition is read and used as needed.

Each component of the reference intention vectors [fb] and [fm] is also referred to as a component reference intention parameter. A large absolute value is assigned to the component reference intention parameter that represents a strong intention of the user to eliminate the corresponding disturbance stimulation. The description follows using examples. FIG. 15 shows the physical reference intention vector [fb]. The parameter types fb1 and fb2 represent intention intensities concerning exhaustion reduction and are assigned values that are obviously larger in the abnormal physical condition than in the normal physical condition. Especially, a seriously abnormal physical condition indicates the maximum value 1. A slightly abnormal physical condition somewhat decreases the value to 0.8. The same applies to the parameter types fb3, fb4, and fb5 representing the intention intensities concerning reconditioning. fb4 (rest) is assigned a somewhat large value even in a normal condition.

FIG. 16 shows the mental reference intention vector [fm]. The parameter type fm5 represents intention intensities concerning mood elevation and is assigned a larger value for disappointment than for neutrality and passion or excitation to emphasize an intention to elevate the mood. The same neutral condition is assigned a larger value for a situation that is requested to be uplifted. By contrast, the parameter types fm6 and fm7 represent intention intensities concerning mood calming, and are assigned larger values in the passion or excitation than in the neutrality. This aims at emphasizing an intention to calm down the excited mood. The same neutral condition is assigned a large value for a situation that is requested to be comforted.

Since no user normally welcomes unpleasant components, larger values are generally assigned to the parameter types fm1 and fm2 that represent the intention intensities concerning unpleasantness elimination. By contrast, passionate, excited, or disappointed users are unable to accept pleasant components due to a lack of mental stability. Small values are generally assigned to the parameter types fm3 and fm4 that represent the intention intensities concerning pleasantness acquisition. Normally, small values are assigned to the neutral condition. The values are increased as a situation is requested to be comforted and then uplifted.

At S4 in FIG. 13, the process corrects the physical reference intention vector [fb] and the mental reference intention vector [fm] to be used. Specifically, the user registration portion 600 in FIG. 2A retrieves rank orders of users in the vehicle and reads physical condition correction factors Dfb and Dfm of a user who is assigned the highest rank order. The physical condition correction factor Dfb corrects component setting values for the physical reference intention vector [fb]. Each user is assigned a unique value according to personal differences of physical stimulation levels preferred by corresponding users. The personal difference signifies a strong or weak stimulation preferred by the user. For example, a user sensitive to the cold may prefer weak cooling of the air conditioning. A user sensitive to the heat may prefer strong cooling thereof. As shown in FIG. 17, the embodiment specifies three grades of values for the physical condition correction factor Dfb corresponding to weak, neutral, and strong. Each component of the vector [fb] is multiplied by the physical condition correction factor Dfb that is set to 1 for "neutral" or no correction, 0.8 for "weak" or value decrease, or 1.2 for "strong" or value increase.

The mental condition correction factor Dfm corrects component setting values for the mental reference intention vector [fm]. Each user is assigned a unique value according to personal differences in demands for disturbance elimination speeds depending on users. The personal difference in demands signifies whether the user is patient or impatient. For example, a user may prefer slow or fast cooling of the air conditioning. The mental condition correction factor Dfm is closely related to character types in the user registration portion 600. The patient character is assigned a small value for the mental condition correction factor Dfm. The impatient character is assigned a large value for the mental condition correction factor Dfm. The embodiment specifies three grades of values for the mental condition correction factor Dfm corresponding to slow, neutral, and fast. Each component of the vector [fm] is multiplied by the mental condition correction factor Dfm that is set to 1 for "neutral" or no correction, 0.8 for "slow" or value decrease, or 1.2 for "fast" or value increase.

Preferences for physical stimulation levels differ from user to user. It is difficult to find a correction condition that equally satisfies the preferences. A solution is to adopt rank orders of users, that is, power relationship between users in the vehicle. The process prioritizes a correction condition for the user assigned with the highest rank order.

FIGS. 19 and 20 show the intention estimation table 371 that contains the components of the corrected vectors [fb] and [fm]. The intention estimation table 371 is stored in the ROM of the hospitality determination section 2 and is structured as follows. The vertical axis of the matrix shows scenes such as getting in the vehicle, getting out of the vehicle, staying in the vehicle, and driving the vehicle in order. Each scene has three hospitality intention categories of safety (to be safe), convenience (to be convenient), and comfort (to be comfortable). As shown in FIG. 20, the hospitality intention category of the convenience (to be convenient) is assigned five intention intensity items corresponding to the components of the physical reference intention vector (parameter). As shown in FIG. 19, the hospitality intention category of the comfort (to be comfortable) is assigned seven intention intensity items corresponding to the components of the mental reference intention vector (parameter).

The horizontal axis of the matrix shows disturbance stimulation items classified into at least three attributes of the tactile sense, the visual sense, and the auditory sense. Though not shown, the olfactory sense is available in addition to the three attributes. The disturbance stimulation includes interior and exterior disturbances. The table shows the interior disturbance. The tactile-sense disturbance stimulation includes airflow temperature, interior object temperature, humidity, and pressure (vibration). The visual-sense disturbance stimulation includes light (illuminance). The auditory-sense disturbance stimulation includes sounds. Values of these stimulations are acquired from inputs of the corresponding sensors (S5 in FIG. 13).

The respective disturbance stimulation values are detected toward positive and negative directions with reference to a neutral value. Specifically, each disturbance stimulation value is detected at five levels, that is, zero as a neutral value, +0.5 and +1.0 in the positive direction and −0.5 and −1.0 in the negative direction. The values vary between contrasting states such as being bright and dark, hot and cold, and noisy and quiet. Specifically, the intensity of the airflow temperature is equivalent to an amplitude and varies between hot, warm, neutral, cool, and cold. The temperature change speed equivalent to a frequency is acquired as a result of function operation and varies between rapid, fast, neutral, slow, and sluggish. The intensity of the interior object temperature varies between hot, neutral, and cold. The intensity of the humidity varies between wet, moistened, neutral, and dry. The intensity of the vibration varies between strong, neutral, and weak. The speed or frequency of the vibration varies between high, neutral, and low. The intensity of the light (illuminance) varies between glaring, neutral, dim, and dark. The speed, frequency, or light color varies between warm color, neutral, and cold color. The intensity of the sound varies between noisy, neutral, and quiet. The speed or frequency of the sound varies between lively, neutral, and gentle.

A large absolute value is assigned to each component of the reference intention vectors [fb] and [fm], that is, the component reference intention parameter that represents a strong intention of the user to eliminate the corresponding disturbance stimulation. Each component corresponds to a cell in the intention estimation table 371 and is multiplied by the corresponding disturbance stimulation value to be calculated as the reference intention parameter (S6 in FIG. 13). When the corresponding disturbance stimulation value is neutral, that is, zero, the product as the intention intensity parameter also becomes zero. Blank cells in FIGS. 19 and 20 indicate that the intention intensity parameter values are zero. This signifies that there is no user intention to eliminate the corresponding disturbance stimulation. This also signifies that the disturbance stimulation state most comfortable to the user is currently available. The value zero for the intention intensity parameter reflects an intention to suppress or prevent an operation of the function that suppresses the disturbance stimulation.

When the absolute value for the corresponding disturbance stimulation is not zero, the intention intensity parameter is not zero. A larger absolute value is interpreted to reflect a stronger intention to eliminate the disturbance stimulation. The intention intensity parameter can be defined by a multiplicative inverse of the product between each component of the reference intention vectors [fb] or [fm] and the corresponding disturbance stimulation value or by a ratio therebetween. An operational definition obviously affects the relation between the absolute value and the magnitude of the intention to eliminate the disturbance stimulation.

The intention intensity parameter sign matches the disturbance stimulation sign. The sign is associated with the control direction of the corresponding function. The disturbance stimulation value varies between the above-mentioned contrasting states. A neutral state exits between the two states. For example, the neutral state signifies the moderate lightness, not too bright or dark, the comfortable temperature, not too hot or cold, or the normal acoustic state, not too noisy or quiet. The sign uniquely represents to which of the two states the disturbance stimulation deflects from the neutral state.

As mentioned above, the absolute value of the reference intention parameter indicates to what extent the user wishes to eliminate the disturbance stimulation deflecting from the neutral value. The reference intention parameter is used to calculate the intention intensity parameter resulting from the multiplication by a disturbance stimulation value. The sign of the intention intensity parameter provides control along the direction for counterbalancing or canceling the disturbance stimulation. The control is provided so as to change from being bright to dark, from being dark to bright, from being hot to cool, or from being cold to warm. The control is provided so as to change from being noisy to quiet or to a state of dissembling the noisiness.

The process actually selects and determines a function using a principle retrieval table 372 in FIG. 21 and a function extraction table 373 in FIG. 22 (S7 and S8 in FIG. 13). The principle retrieval table 372 has the same cell structure as the intention estimation table 371 but uses a cell to store principle specification information for specifying the function principle as function specification information. The function extraction table 373 is attached to the principle retrieval table 372 and provides a two-dimensional table that associates each principle specification information with an individual function. Each table cell stores function adoption priority information that indicates seat-based priorities for adopting corresponding functions.

The following describes a more specific example with reference to a representative part related to the mental reference intention vector. The basic process flow is the same as an equivalent part related to the physical reference intention vector. FIG. 19 shows a setting part of the mental reference intention vector [fm] extracted from the intention estimation table 371. FIG. 21 shows the corresponding part extracted from the principle retrieval table 372. In FIG. 19, components [fm1, fm2, fm3, fm4, fm5, fm6, fm7] of the mental reference intention vector [fm] are assigned setting values [1, 1, 0.2, 0.2, 0.2, 0.8, 0.8], respectively. The components are multiplied by Dfm=0.8 and are corrected to [0.8, 0.8, 0.16, 0.16, 0.16, 0.64, 0.64] that are stored in the intention estimation table 371. As regards disturbances, minimum value −1.0 is detected for the light intensity as the visual-sense disturbance. The corresponding cells store intention intensity parameter values set to [−0.8, −0.8, −0.16, −0.16, −0.16, −0.64, −0.64].

The corresponding part of the principle retrieval table 372 in FIG. 21 stores the visual-sense principle specification information. For example, the corresponding part of the principle retrieval table 372 stores the unpleasantness elimination, eliminating a source of stress, strengthen communication, and corresponding intention items "displayed interiorly" for the rational group and "illuminated interiorly" for the emotional group. A blank cell in the table indicates that the corresponding function principle does not exist. Though not shown, the former is associated with functions of the function extraction table 373 in FIG. 22, for example, the functions that turn on displays of meters, indicators, a car navigation system, and a car stereo at night or in darkness. The latter concerns the interior lighting. The function extraction table 373 in FIG. 22 shows selectable functions rated priority "3" of the illumination as the interior lamp 511 in FIG. 1 for illuminating vertically on the floor and the ceiling corresponding to such cells as interior effect, visual sense effect, lighting, front and rear, and left and right. The corresponding intention intensity parameter is set to value −0.8 indicating considerably dark. To counterbalance this, the hospitality control section generates an illumination output corresponding to +0.8 for controlling so as to brighten the display and the lighting (S9 in FIG. 13).

In FIG. 19, an intermediately small value −0.5 is detected for the airflow temperature (intensity) as the tactile-sense disturbance. The corresponding cells store intention intensity parameter values set to [−0.4, −0.4, −0.08, −0.08, −0.08, −0.32, −0.32].

The corresponding part of the principle retrieval table 372 in FIG. 21 shows the tactile-sense principle specification information in terms of an intention item "air-conditioned interiorly" for the emotional group corresponding to unpleasantness elimination, eliminating a source of stress, and solving heat or cold. The information is associated with the air conditioner function of the function extraction table 373 in FIG. 22, though not shown. The corresponding intention intensity parameter is set to value −0.4 (cool). To counterbalance this, the hospitality control section controls the air conditioner by generating a warming output corresponding to +0.4 so as to heat the vehicle compartment (S9 in FIG. 13).

The table stores an intention item of "illuminated interiorly" (emotional) as the principle specification information corresponding to unpleasantness elimination, dissembling, and providing interested information. The corresponding function is lighting color adjustment and varies the lighting color so as to shift to long wavelengths such as yellow, umber, red, pink, or white lights tinged with these colors. The colors belong to warm colors and excel in effects of warmth or those contributing the mood elevation.

The table further stores an intention item of "all displayed interiorly" (rational) as the principle specification information corresponding to pleasantness acquisition, and obtaining a favorite or an image. For example, the principle specification information is associated with information (not shown) stored in the function extraction table 373 in FIG. 22. For example, the table stores guidance information about facilities for providing coolness such as cafe and pool. The information is output from a car navigation system function, for example. The table stores an intention item of "sound generated interiorly" (emotional) as the principle specification information corresponding to favorable impression provision. The information is associated with a sound effect output function (not shown) for providing coolness expressed by sounds of stream, wave, and wind.

In FIG. 19, the sound or intensity of the auditory-sense disturbance is detected to indicate the maximum value of +1.0 of the five levels, that is, very noisy. The corresponding cells store intention intensity parameter values set to [0.8, 0.8, 0.16, 0.16, 0.16, 0.64, 0.64]. The corresponding part of the principle retrieval table 372 in FIG. 21 shows the auditory-sense principle specification information in terms of an intention item "sound insulated interiorly" for the emotional group corresponding to unpleasantness elimination, eliminating a source of stress, and insulating noise. The information is associated with the noise canceller 1001B (not shown) in the function extraction table 373 in FIG. 22. The corresponding intention intensity parameter is set to value 0.8. To counterbalance this, the hospitality control section controls the noise canceller 100B (S9 in FIG. 13) by outputting a sound equivalent to +0.8 so as to cancel the interior noise.

The table stores an intention item of "all displayed interiorly" (rational) as the principle specification information corresponding to pleasantness acquisition, obtaining a favorite or an image, and providing hobby information. Though not shown, the information is associated with a music output function of the car stereo in the function extraction table 373 in FIG. 22. A music source is appropriately selected in accordance with the physical or mental condition (S9 in FIG. 13).

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a vehicular user hospitality system is provided as follows. A plurality of hospitality operating portions are included that perform a hospitality operation for assisting a user to use a vehicle or for entertaining a user. A biological condition acquisition means is included that acquires biological user information reflecting a physical condition and a mental condition of a user. A physical/mental condition specification means is included for specifying a physical condition and a mental condition of the user based on a content of acquired biological user information. A hospitality determination section is included that determines a content of a hospitality operation performed by the hospitality operating portion based on specified physical or mental condition. A hospitality control section is included that controls an operation of a corresponding hospitality operating portion so as to perform a hospitality operation in accordance with a content determined by the hospitality determination section. The hospitality determination section includes: a reference intention intensity parameter value determination means for uniquely determining a reference intention parameter value in accordance with the specified physical or mental condition in regard to a set of reference intention parameters that is defined so as to individually correspond to a plurality of hospitality intention categories containing at least one of safety, convenience, and comfort, and provides a reference value of an intention intensity for each hospitality intention; a disturbance stimulation detection means for detecting a plurality of disturbance stimulations containing at least one of tactile-sense, visual-sense, auditory-sense, and olfactory-sense attributes concerning the user; a storage portion for an intention estimation table that is constructed as a two-dimensional table for associating a type of the disturbance stimulation with the hospitality intention category and contains a cell assigned with an intention intensity parameter value; a storage portion for a function specification table that is constructed as a two-dimensional table for associating a type of the disturbance stimulation with the hospitality intention category and contains a cell storing function specification information for specifying a function of the hospitality operating portion matching an attribute of the disturbance stimulation and the hospitality intention category; an intention intensity parameter calculation means for calculating and assigning the intention intensity parameter value to each cell of the intention estimation table using a reference intention parameter value for the corresponding hospitality intention category and a disturbance stimulation value of the corresponding type; a function extraction means for extracting a function of the hospitality operating portion from a corresponding cell of the function extraction table associated with cells in the intention estimation table in accordance with a combination of the hospitality intention category and the disturbance stimulation attribute; and a control content determination means for determining a control content of an extracted function based on the intention intensity parameter value assigned to a cell of the intention estimation table. The hospitality control section controls operations of the function of the hospitality operating portion based on the determined control content.

According to the above-mentioned construction, the system recognizes a situation concerning the use of a vehicle in accordance with a combination of a disturbance stimulation type and a hospitality intention category. The system references an intention estimation table and determines a reference intention parameter value for providing an intensity reference of a hospitality intention (wish) for at least one of safety, convenience, and comfort categories. The system settles an intention intensity reference using a reference intention parameter value specific to each of situations concerning the use of a vehicle, that is, intention categories and disturbance types. The system supplements the reference intention parameter value with the current disturbance stimulation value to determine an intention intensity parameter value. The intention intensity parameter value can be appropriately used as a function selection reference value in consideration for a disturbance stimulation magnitude. A function specification table is used to extract function specification information for specifying a function of a hospitality operating portion in accordance with a combination of the disturbance stimulation type and the hospitality intention category. The system determines a control content of the extracted function based on the intention intensity parameter value. The system can appropriately select and operate a function matching the hospitality intention at a level corresponding to the disturbance stimulation value. An operation content of the hospitality operating portion appropriately varies with a content of the biological user information. The system can optimize a service or hospitality effect for a vehicle user in accordance with the mental or physical condition of the user.

The following are examples of the functions used for the hospitality. The tactile-sense function controls temperatures and can be exemplified by an air conditioner. The function of the air conditioner is to adjust an interior temperature and is mainly used for a driving or stay scene. For example, lowering an air conditioner temperature can calm an elevated or excited mental condition or relieve a physical condition heated due to fatigue.

The tactile-sense hospitality function also controls the interior comfort. A seat position or height greatly affects interior conditions. For a driver, a steering wheel position is also an important factor. Accordingly, a seat or steering wheel position adjustment function may concern the hospitality intention. The function is mainly used for the driving or stay scene. When a degraded physical condition decreases the concentration, for example, the function can move the seat position forward and slightly heighten the steering wheel position and help improve the concentration for driving. When a driver is excited or tired, the function can move the seat position backward and slightly lower the steering wheel position and effectively relax the mental condition and reduce the fatigue.

The visual-sense function controls interior and exterior brightness and can be exemplified by interior and exterior lighting devices. The exterior illumination light not only indispensably functions as a headlamp for driving at night, but also can be used to greet a user when approaching a vehicle. The interior illumination light is important for recognizing positions of interior devices to be operated and providing an interior atmosphere. In this case, the function can adjust a light volume or color in accordance with the physical or mental condition.

The visual-sense function controls visual sense information. One example of the visual sense information is map information output to a car navigation system. Another example is video information available from a television or DVD. The car navigation system or a video output apparatus implements the visual-sense function.

The auditory-sense function controls sounds and can be exemplified by a car audio system. The function can vary an output volume of the car audio system or a selection content of a music source to be output in accordance with the physical or mental condition of a user. A music source intended by the user is automatically selected in accordance with a mood or a character of the user so as to output the performance. It is possible to entertain the user driving the vehicle or staying in it at the right time. An acoustic noise canceling system can be provided as a function that operates in the background for adjusting an interior acoustic environment.

The reference intention intensity parameter value determination means can determine a physical reference intention parameter value individually corresponding to a plurality of hospitality intention categories corresponding to the physical condition and a mental reference intention parameter value individually corresponding to a plurality of hospitality intention categories corresponding to the mental condition independently of each other. The intention estimation table and the function extraction table can contain the hospitality intention category that is separated into a physical hospitality intention corresponding to the physical reference intention parameter value and a mental hospitality intention corresponding to the mental reference intention parameter value. The hospitality intention categories are divided into physical and mental hospitality intentions. The intention estimation table and the function extraction table are separately provided in association with each other. It is possible to easily prevent contention between function selections according to the mental and physical conditions. An algorithm for function selections can be greatly simplified. It is possible to select a function appropriately reflecting the mental and physical conditions.

The physical-condition reference intention parameter types can include at least parameter types representing intention intensities concerning exhaustion reduction and those concerning reconditioning. The function selection can directly reflect the natural wish of the user for physical conditions represented by a "hospitality intention" such as "avoiding the pain" or "relieving the pain," for example. The mental reference intention parameter types can contain those representing intention intensities concerning unpleasantness elimination, pleasantness acquisition, mood elevation, and mood calming. The function selection can directly reflect the hospitality intention directly associated with the mental condition improvement such as "decreasing a mental stress due to an unpleasant factor" or "correcting the mental condition deflected from the neutral state."

The physical/mental condition specification means can specify a physical condition of the user according to a range between a normal physical condition and an abnormal physical condition based on a content of the biological user information. The reference intention intensity parameter value determination means can provide a higher intention intensity reflected on a parameter concerning exhaustion reduction and reconditioning for the abnormal physical condition than for the normal physical condition. An abnormal physical condition causes a high intention intensity for selecting a function that directly contributes to exhaustion reduction and reconditioning. It is possible to reliably reduce a load on the user.

The physical/mental condition specification means can specify a mental condition of the user according to a range between excited, neutral, and disappointed states based on a content of the biological user information. The reference intention intensity parameter value determination means can provide a higher intention intensity reflected on a parameter concerning mood calming for the excited state than for the neutral and disappointed states and provide a higher intention intensity reflected on a parameter concerning mood elevation for the disappointed state than for the neutral and excited states. The user's excited mental condition causes a high intention intensity for selecting the function that directly contributes to mood calming. The mental condition can be effectively calmed. When the user drives a vehicle, a good mental basis for safe driving can be ensured. The user's disappointed mental condition causes a high intention intensity for selecting the function that directly contributes to mood uplifting. The mental condition can be appropriately uplifted. The time for staying in the vehicle can become more satisfactory. It is possible to restore the user's mental condition distracted by the disappointment. When the user drives a vehicle, a good mental basis for safe driving can be ensured likewise.

The physical/mental condition specification means can specify the neutral state according to a range between an uplifting state and the other states based on a content of the biological user information. The reference intention intensity parameter value determination means can provide a higher intention intensity reflected on a parameter concerning pleasantness acquisition for the uplifting state in the neutral state than for the other states. The user's mental condition, when uplifted, causes a high intention intensity for selecting the function that directly contributes to pleasantness acquisition. The mental condition can be appropriately uplifted. The time for staying in the vehicle can become more satisfactory.

The function specification table can be a principle retrieval table storing principle specification information for specifying a principle of the function as the function specification information in the cell and can be provided with a function extraction table that is attached to the principle retrieval table and provides a two-dimensional for associating each principle specification information with an individual function having each table cell storing function adoption priority information indicative of a seat-based priority for adopting a corresponding function. The function extraction means can retrieve the principle specification information from the principle retrieval table and retrieve the individual function belonging to a retrieved principle from the function extraction table. The control content determination means can determine a control content so as to perform a retrieved individual function according to a priority indicated by the corresponding function adoption priority information. For example, multiple function groups may be provided for different positions in the vehicle and may be common to the function principle. In the above-mentioned construction, the function group is broadly specified according to the principle specification information. Individual functions belonging to the function group are sequentially performed in the order of priorities in consideration for seating positions of users. It is possible to quickly locate the function that is optimal for realizing a hospitality intention of the detected or specified user.

The disturbance stimulation value for each type can be set toward positive and negative directions with reference to a neutral value. A larger absolute value is assigned to the reference intention parameter that represents a stronger user intention to eliminate a corresponding disturbance stimulation. Different signs can be assigned to the parameters that indicate intentions to offset and eliminate the disturbance stimulation. The intention intensity parameter calculation means can perform a predetermined operation of combining the reference intention parameter value with the disturbance stimulation value so as to acquire an operation result reflecting a sign of the disturbance stimulation value and settle an operation result as the intention intensity parameter value. The control content determination means can settle control output of a corresponding function in a predetermined control direction in accordance with the sign based on the intention intensity parameter value.

Many disturbance stimulation values vary between contradicting states such as bright and dark, hot and cold, and noisy and silent, for example. Obviously, a neutral state exists between the two states. That is, the neutral state signifies a moderately bright state, not too bright or dark, a comfortable temperature, not too hot or cold, or a normal acoustic state, not too noisy or silent. The sign can uniquely indicate to which of the two states the disturbance stimulation deflects from the neutral state as a reference. An absolute value of the intention intensity parameter can indicate to what degree the user wishes to eliminate the disturbance stimulation deflecting from the neutral value. The sign can identify a direction of control for offsetting or cancelling the disturbance stimulation. The sign of the intention intensity parameter value matches the sign of the disturbance stimulation. For example, a bright state is darkened and a dark state is brightened. A hot state is cooled and a cold state is warmed. For example, the intention intensity parameter calculation means may settle the intention intensity parameter value based on multiplication between the reference intention parameter value and the disturbance stimulation value. Increasing the absolute value of the multiplication result also increases an output from the function for realizing the hospitality intention and allows the control content to be recognized easily.

When an air conditioner embodies the function, an operation content determination means can determine an operation content so that increasing the absolute value of the intention intensity parameter also increases an air conditioning output level. The absolute value and the sign of the corresponding intention intensity parameter indicate to what degree the user sensorily feels "hot" or "cold." The negative sign corresponds to "hot" and the positive sign corresponds to "cold." The air conditioning output level for warming or cooling can be quickly adjusted to an appropriate state of each user. The operation content determination means can determine an operational output content of the air conditioner so that the setup temperature increases as the user's mental condition is elevated. The body temperature tends to increase when the mental condition is excessively elevated. Decreasing the air conditioning temperature can cool down the elevated mental condition. When the mental condition is depressed, the setup temperature increases to facilitate sweating and blood circulation, making it possible to elevate the mental or physical condition.

When a car audio system embodies the function, the operation content determination means can determine an operation content so that increasing the absolute value of the intention intensity parameter increases an output volume. When an interior noise level is so high as to be noise, the audio output increases. The music overwhelms the noise, making it possible to easily listen to the music. The operation content determination means can also change the selected content of a music source output from the car audio system in accordance with the absolute value of the intention intensity parameter. The music source can be appropriately selected in accordance with the physical or mental condition. For example, the operation content determination means empirically retrieves a music source or a song appropriate to each physical or mental condition based on statistical information about songs selected by the user. The operation content determination means uniquely defines and stores relation between a song and a user state index or the above-mentioned difference. It is possible to easily optimize song selection contents corresponding to intention intensity parameter values.

When a vehicle interior lighting apparatus embodies the function, the operation content determination means can determine an operation content so that increasing the absolute value of the intention intensity parameter also increases the illumination light volume. For example, the operation content determination means can determine an operational output content of the vehicle interior lighting apparatus so that short-wavelength lighting colors such as light green, blue, light blue, and bluish white are used as the user's mental condition is elevated. These lighting colors belong to cold colors. The colors can give the effect of softening and calming the elevated mental condition and make comfortable the atmosphere during stay in the vehicle. When the mental condition is depressed, the operation content determination means can determine an operational output content of the vehicle interior lighting apparatus so as to shift to long-wavelength colors such as yellow, umber, red, pink, or white lights tinged with these colors. The colors belong to warm colors and excel in a relaxing effect by elevating or warming the mood.

The intention intensity parameter calculation means can include a user registration means for storing multiple users registered to the vehicle in association with a rank order and an intention intensity parameter correction content of each user and a user specification means for specifying a user getting into the vehicle. The intention intensity parameter calculation means can use the intention intensity parameter correction content so as to prioritize an intention intensity parameter correction content of the specified user corresponding to a high rank order. The intention intensity parameter calculation means can correct and calculate the intention intensity parameter value. Registered users can be assigned rank orders. When there are specified more than one user who actually uses the vehicle, the intention intensity parameter calculation means selects an intention intensity parameter correction content for a user assigned the highest rank order. The hospitality content can properly reflect the intention of the user assigned the highest rank order. The user can be treated as a very important person.

The intention intensity parameter calculation means can include a user character type specification means for specifying a character type of a user getting into the vehicle and correct and calculates the intention intensity parameter value corresponding to a character type of the specified user. It is possible to fine-tune a hospitality content according to the user's character type and provide a detailed response.

It will be obvious to those skilled in the art that various changes may be made in the above-described embodiments of the present invention. However, the scope of the present invention should be determined by the following claims.

What is claimed is:

1. A vehicular user hospitality system comprising:
a plurality of hospitality operating portions that perform a hospitality operation for assisting a user to use a vehicle or for entertaining a user;
a biological condition acquisition means that acquires biological user information reflecting a physical condition and a mental condition of a user;
a physical/mental condition specification means for specifying a physical condition and a mental condition of the user based on a content of the acquired biological user information;
a hospitality determination section that determines a content of a hospitality operation performed by the hospitality operating portion based on the specified physical or mental condition; and
a hospitality control section that controls an operation of a corresponding hospitality operating portion so as to perform a hospitality operation in accordance with the content determined by the hospitality determination section,
wherein the hospitality determination section includes:
a reference intention intensity parameter value determination means for uniquely determining a reference intention parameter value in accordance with the specified physical or mental condition in regard to a set of reference intention parameters that is defined so as to individually correspond to a plurality of hospitality intention categories containing at least one of safety, convenience, and comfort, and provides a reference value of an intention intensity for each hospitality intention;
a disturbance stimulation detection means for detecting a plurality of disturbance stimulations containing at least one of tactile-sense, visual-sense, auditory-sense, and olfactory-sense attributes concerning the user;
a storage portion for an intention estimation table that is constructed as a two-dimensional table for associating a type of the disturbance stimulation with the hospitality intention category and contains a cell assigned with an intention intensity parameter value;
a storage portion for a function specification table that is constructed as a two-dimensional table for associating a type of the disturbance stimulation with the hospitality intention category and contains a cell storing function specification information for specifying a function of the hospitality operating portion matching an attribute of the disturbance stimulation and the hospitality intention category;

an intention intensity parameter calculation means for calculating and assigning the intention intensity parameter value to each cell of the intention estimation table using a reference intention parameter value for the corresponding hospitality intention category and a disturbance stimulation value of the corresponding type;

a function extraction means for extracting a function of the hospitality operating portion from a corresponding cell of the function specification table associated with cells in the intention estimation table in accordance with a combination of the hospitality intention category and the disturbance stimulation attribute; and a control content determination means for determining a control content of an extracted function based on the intention intensity parameter value assigned to a cell of the intention estimation table, wherein the hospitality control section controls operations of the function of the hospitality operating portion based on the control content determined by the control content determination means.

2. The vehicular user hospitality system according to claim 1, wherein the reference intention intensity parameter value determination means determines a physical reference intention parameter value individually corresponding to a plurality of hospitality intention categories corresponding to the physical condition and a mental reference intention parameter value individually corresponding to a plurality of hospitality intention categories corresponding to the mental condition independently of each other; and wherein the intention estimation table and the function extraction table contain the hospitality intention category that is separated into a physical hospitality intention corresponding to the physical reference intention parameter value and a mental hospitality intention corresponding to the mental reference intention parameter value.

3. The vehicular user hospitality system according to claim 2, wherein types of the physical reference intention parameter include at least a parameter type representing an intention intensity concerning exhaustion reduction and a parameter type representing an intention intensity concerning reconditioning; and wherein types of the mental reference intention parameter include at least a parameter type representing an intention intensity concerning unpleasantness elimination, a parameter type representing an intention intensity concerning pleasantness acquisition, a parameter type representing an intention intensity concerning mood elevation, and a parameter type representing an intention intensity concerning mood calming.

4. The vehicular user hospitality system according to claim 3, wherein the physical/mental condition specification means specifies a physical condition of the user according to a range between a normal physical condition and an abnormal physical condition based on a content of the biological user information; and wherein the reference intention intensity parameter value determination means provides a higher intention intensity reflected on a parameter concerning exhaustion reduction and reconditioning for the abnormal physical condition than for the normal physical condition.

5. The vehicular user hospitality system according to claim 3, wherein the physical/mental condition specification means specifies a mental condition of the user according to a range between excited, neutral, and disappointed states based on a content of the biological user information; and wherein the reference intention intensity parameter value determination means provides a higher intention intensity reflected on a parameter concerning mood calming for the excited state than for the neutral and disappointed states and provides a higher intention intensity reflected on a parameter concerning mood elevation for the disappointed state than for the neutral and excited states.

6. The vehicular user hospitality system according to claim 3, wherein the physical/mental condition specification means specifies the neutral state according to a range between an uplifting state and other states based on a content of the biological user information; and wherein the reference intention intensity parameter value determination means provides a higher intention intensity reflected on a parameter concerning pleasantness acquisition for the uplifting state in the neutral state than for the other states.

7. The vehicular user hospitality system according to claim 1, wherein the function specification table is a principle retrieval table storing principle specification information for specifying a principle of the function as the function specification information in the cell and is provided with a function extraction table that is attached to the principle retrieval table and provides a two-dimensional table for associating each principle specification information with an individual function having each table cell storing function adoption priority information indicative of a seat-based priority for adopting a corresponding function;

wherein the function extraction means retrieves the principle specification information from the principle retrieval table and retrieves the individual function belonging to a retrieved principle from the function extraction table; and wherein the control content determination means determines a control content so as to perform a retrieved individual function according to a priority indicated by the corresponding function adoption priority information.

8. The vehicular user hospitality system according to claim 1, wherein the disturbance stimulation value for each type is allowed to be set toward positive and negative directions with reference to a neutral value;

wherein a larger absolute value is assigned to the reference intention parameter that represents a stronger user intention to eliminate a corresponding disturbance stimulation;

wherein the intention intensity parameter calculation means performs a predetermined operation of combining the reference intention parameter value with the disturbance stimulation value so as to acquire an operation result reflecting a sign of the disturbance stimulation value and settles an operation result as the intention intensity parameter value; and wherein the control content determination means settles control output of a corresponding function in a predetermined control direction in accordance with the sign based on the intention intensity parameter value.

9. The vehicular user hospitality system according to claim 8, wherein the intention intensity parameter calculation means settles the intention intensity parameter value based on multiplication between the reference intention parameter value and the disturbance stimulation value.

10. The vehicular user hospitality system according to claim 1, wherein the intention intensity parameter calculation means includes a user registration means for storing a plurality of users registered to the vehicle in association with a rank order and an intention intensity parameter correction content of each user and a user specification means for specifying a user getting into the vehicle, uses the intention intensity parameter correction content so as to prioritize an intention intensity parameter correction content of the specified user corresponding to a high rank order, and corrects and calculates the intention intensity parameter value.

11. The vehicular user hospitality system according to claim 1, wherein the intention intensity parameter calculation means includes a user character type specification means for specifying a character type of a user getting into the vehicle and corrects and calculates the intention intensity parameter value corresponding to a character type of the specified user.

* * * * *